(12) United States Patent
Kim et al.

(10) Patent No.: US 10,133,903 B2
(45) Date of Patent: Nov. 20, 2018

(54) REMOTE CONTROL DEVICE AND OPERATING METHOD THEREOF

(71) Applicant: LG ELECTRONICS INC., Seoul (KR)

(72) Inventors: Geonwoo Kim, Seoul (KR); Seonil Yu, Seoul (KR); Kwangseob Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 14 days.

(21) Appl. No.: 15/327,939

(22) PCT Filed: Jul. 29, 2014

(86) PCT No.: PCT/KR2014/006958
§ 371 (c)(1),
(2) Date: Jan. 20, 2017

(87) PCT Pub. No.: WO2016/013705
PCT Pub. Date: Jan. 28, 2016

(65) Prior Publication Data
US 2017/0206398 A1    Jul. 20, 2017

(30) Foreign Application Priority Data

Jul. 23, 2014   (KR) .......................... 10-2014-0093539

(51) Int. Cl.
*G06K 9/00*       (2006.01)
*G06F 21/32*      (2013.01)
(Continued)

(52) U.S. Cl.
CPC ... *G06K 9/00013* (2013.01); *G06F 17/30256* (2013.01); *G06F 21/32* (2013.01);
(Continued)

(58) Field of Classification Search
None
See application file for complete search history.

(56) References Cited

U.S. PATENT DOCUMENTS

| 6,256,019 B1 * | 7/2001 | Allport | G07C 9/00158 283/74 |
| 2008/0052626 A1 * | 2/2008 | Han | G06F 3/0482 715/721 |

(Continued)

FOREIGN PATENT DOCUMENTS

| EP | 2894629 A1 | 7/2015 |
| KR | 10-2006-0114261 A | 11/2006 |

(Continued)

*Primary Examiner* — Hadi Akhavannik
(74) *Attorney, Agent, or Firm* — Birch, Stewart, Kolasch & Birch, LLP

(57) ABSTRACT

An operating method of a remote control device according to an embodiment of the present invention includes searching at least one of the image display device and external devices, and acquiring device information on at least one of the searched image display device and external devices. The remote control device receives an input first fingerprint for a user preference setting operation of setting at least one of the image display device and external devices to a personalized setting of a user, and acquires user preference setting information including a setting value of the user preference setting operation on the basis of the acquired device information and a first fingerprint image corresponding to the input first fingerprint. The remote control device sets the image display device or external device corresponding to the acquired user preference setting information to the personalized setting of the user corresponding to the first fingerprint on the basis of the user preference setting information.

20 Claims, 21 Drawing Sheets

(51) Int. Cl.
    *H04Q 9/00*    (2006.01)
    *G06F 17/30*   (2006.01)
    *H04L 29/08*   (2006.01)
    *H04L 12/28*   (2006.01)
    *H04N 21/422*  (2011.01)
    *H04N 21/436*  (2011.01)
    *H04N 21/4415* (2011.01)
    *H04N 21/45*   (2011.01)
    *H04N 21/475*  (2011.01)
    *H04N 21/485*  (2011.01)
    *H04W 4/50*    (2018.01)
    *H04N 5/44*    (2011.01)
    *H04W 4/80*    (2018.01)

(52) U.S. Cl.
    CPC ...... *G06K 9/00087* (2013.01); *H04L 12/2807* (2013.01); *H04L 12/2829* (2013.01); *H04L 67/125* (2013.01); *H04L 67/16* (2013.01); *H04L 67/306* (2013.01); *H04L 67/34* (2013.01); *H04N 21/42222* (2013.01); *H04N 21/43615* (2013.01); *H04N 21/4415* (2013.01); *H04N 21/4532* (2013.01); *H04N 21/4753* (2013.01); *H04N 21/485* (2013.01); *H04Q 9/00* (2013.01); *H04W 4/50* (2018.02); *H04L 2012/2849* (2013.01); *H04N 2005/4428* (2013.01); *H04W 4/80* (2018.02)

(56) References Cited

U.S. PATENT DOCUMENTS

| | | | |
|---|---|---|---|
| 2009/0251619 | A1  | 10/2009 | Seidel et al. |
| 2010/0248822 | A1  | 9/2010  | Migos et al. |
| 2011/0045809 | A1* | 2/2011  | Yu ............ H04L 12/2827 |
| | | | 455/414.1 |
| 2011/0068897 | A1  | 3/2011  | Yum et al. |
| 2012/0054269 | A1* | 3/2012  | Choi .......... H04L 67/16 |
| | | | 709/203 |
| 2013/0147705 | A1  | 6/2013  | Lee et al. |
| 2015/0242986 | A1  | 8/2015  | Yoshizawa |
| 2017/0251269 | A1  | 8/2017  | Yoshizawa |

FOREIGN PATENT DOCUMENTS

| | | |
|---|---|---|
| KR | 10-2011-0030908 A | 3/2011 |
| KR | 10-2011-0081603 A | 7/2011 |
| KR | 10-2012-0009536 A | 2/2012 |
| KR | 10-2013-0063788 A | 6/2013 |
| WO | WO 2012/094520 A2 | 7/2012 |
| WO | WO 2014/083669 A1 | 6/2014 |

* cited by examiner

REMOTE CONTROL DEVICE AND OPERATING METHOD THEREOF

CROSS REFERENCE TO RELATED APPLICATIONS

This application is the National Phase of PCT International Application No. PCT/KR2014/006958, filed on Jul. 29, 2014, which claims priority under 35 U.S.C. 119(a) to Patent Application No. 10-2014-0093539, filed in Republic of Korea on Jul. 23, 2014, all of which are hereby expressly incorporated by reference into the present application.

TECHNICAL FIELD

The present invention relates to a remote control device and an operating method thereof, and more particularly, to a remote control device that recognizes a fingerprint of a user and sets an associated external device to a user preference setting corresponding to the recognized fingerprint, and an operating method of the remote control device.

BACKGROUND ART

Recently, various electronic devices have been used in homes and companies. In addition, such various electronic devices perform different operations. Accordingly, a user is provided with various functions using various electronic devices.

Meanwhile, various electronic devices perform different operations, and kinds or degrees of the performed operations may be different. A user of an electronic device may differently set not only whether the electronic device performs an operation but also a kind or degree of the operation performed by the electronic device. Thus, users set operations of electronic devices used thereby to setting values that the users desire. A specific setting performed on an operation of an electronic device used by a user is referred to as a user setting, and a setting value for the user setting is referred to as a user setting value.

However, although a user sets each electronic device to a desired setting value, if another user changes the setting value, the setting value set by the previous user is no longer applied. Therefore, a setting value for the electronic device should be again input.

For this reason, recent electronic devices provide a setting value storing function such that each user can provide a proper setting value.

However, a user should perform a setting operation for applying a setting value of the user to an electronic device to use the setting value storing function, which is inconvenient to the user. In addition, the user has difficulty in searching a setting value of the user among a plurality of setting values.

Accordingly, there is required a method for accurately recognizing a user and easily performing a setting operation of the recognized user.

DISCLOSURE OF THE INVENTION

Technical Problem

An object of the present invention is to provide a remote control device that recognizes a fingerprint of a user and sets an associated external device to a personalized user preference setting value of the recognized user.

Another object of the present invention is to transmit a user preference setting signal through a communication scheme corresponding to that of an external device associated with a remote control device.

Technical Solution

According to an aspect of the present invention, there is provided a method for operating a remote control device, the method including: searching at least one of an image display device and external devices; acquiring device information on at least one of the searched image display device and external devices; receiving an input first fingerprint for a user preference setting operation of setting at least one of the image display device and external devices to a personalized setting of a user; acquiring user preference setting information including a setting value of the user preference setting operation on the basis of the acquired device information and a first fingerprint image corresponding to the input first fingerprint; and setting the image display device or external device corresponding to the acquired user preference setting information to the personalized setting of the user corresponding to the first fingerprint on the basis of the user preference setting information.

According to an aspect of the present invention, there is provided a remote control device including: a user input unit; a wireless communication unit configured to transmit/receive signals; a fingerprint recognition unit configured to receive an input first fingerprint of a user for a user preference setting operation of setting at least one of an image display device and external devices to a personalized setting of the user; and a controller configured to search at least one of the image display device and external devices, acquire device information on the at least one of the searched image display device and external devices, acquire user preference setting information including a setting value of the user preference setting operation on the basis of a first fingerprint image corresponding to the input first fingerprint, and set the image display device or external device corresponding to the acquired user preference setting information to a personalized setting of the user corresponding to the first fingerprint on the basis of the user preference setting information.

Advantageous Effects

According to various embodiments of the present invention, a personalized setting value of a user can be provided to an electronic device associated with the remote control device by recognizing only a fingerprint of the user. Thus, setting values of various electronic devices can be easily changed.

Further, a user preference setting signal can be transmitted in a communication scheme supported by an electronic device associated with the remote control device. Thus, user setting operations of various electronic devices can be performed.

MODE FOR CARRYING OUT THE INVENTION

Description will now be given in detail of a mobile terminal according to the exemplary embodiments, with reference to the accompanying drawings. Hereinafter, suffixes "module" and "unit or portion" for components used herein in description are merely provided only for facilitation of preparing this specification, and thus they are not granted a specific meaning or function. Hence, it should be noticed that "module" and "unit or portion" can be used together.

Hereinafter, a screen display control method and an image display device using the same according to an embodiment of the present invention will be described in detail with reference to the accompanying drawings.

The image display device according to the embodiment of the present invention is, for example, an intelligent image display device in which a computer supporting function is added to a broadcast reception function. Therefore, the image display device has an Internet function and is equipped with an interface such as a manual type input device, a touch screen, or a spatial remote control, for convenient use, as well as is faithful to the broadcast reception function. In addition, functions such as an email, web browsing, banking, or a game may be performed by connecting to the internet and a computer with a wired or wireless internet function supported. For these various functions, a standardized general-purpose OS may be used.

Accordingly, since, in the image display device described in the present invention, for example, various applications are freely added or deleted to or from the general-purpose OS kernel, various user-friendly functions may be performed. More specifically, the image display device may be a network TV, an HBB TV, a smart TV, an LED TV, an OLED TV, or the like. In some cases, the image display device may also be applied to a smart phone.

Figure 1:
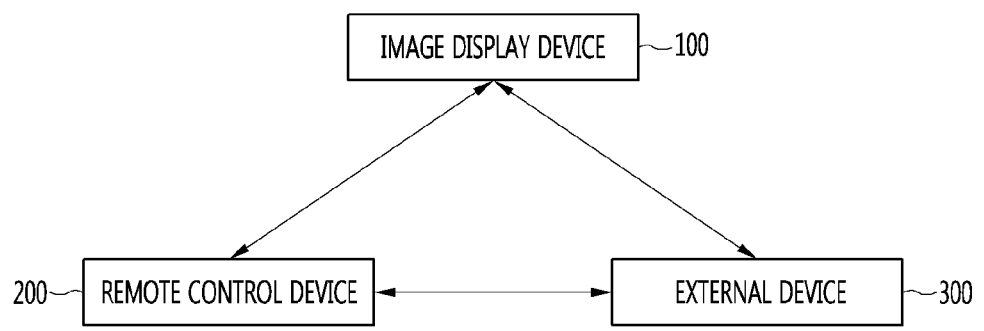
FIG. 1 illustrates a remote control system according to an embodiment of the present invention.

FIG. 1 illustrates an external device setting system 1 according to an embodiment of the present invention.

The external device setting system 1 according to the embodiment of the present invention includes an image display device 100, a remote control device 200, and an external device 300.

The image display device 100 may search a user setting value corresponding to a recognized fingerprint of a user and transmit the searched user setting value to the remote control device 200. Also, the image display device 100 may transmit a user setting signal to the external device 300.

The image display device 100 according to the embodiment of the present invention, for example, is an intelligent image display device in which a computer supporting function is added to a broadcast reception function. Therefore, the image display device has an Internet function and is equipped with an interface such as a manual type input device, a touch screen, or a spatial remote control, for convenient use, as well as is faithful to the broadcast reception function. In addition, functions such as an email, web browsing, banking, or a game may be performed by connecting to the internet and a computer with a wired or wireless internet function supported. For these various functions, a standardized general-purpose OS may be used.

The image display device 100 may be any one of a network TV, an HBB TV, a smart TV, an LED TV, and an OLED TV. In some cases, the image display device 100 may also be applied to a smart phone.

The remote control device 200 may remotely control at least one of the image display device 100 and the external device 300.

The remote control device 200 may recognize a fingerprint of a user, and transmit a user setting signal based on user setting information corresponding to the recognized fingerprint to image display device 100 or the external device 300.

The remote control device 200 may transmit a control signal to the image display device 100 or the external device 300 through various communication schemes. This will be described later.

The remote control device 200 may be any one of a space remote controller, a smartphone, and a smart pad, but the present invention is not limited thereto.

The external device 300 may receive a control signal from the remote control device 200, and perform a function corresponding to the received control signal.

The external device 300 may be wiredly or wirelessly connected to the image display device 100. Also, the external device 300 may be wiredly or wirelessly connected to the Internet.

In an embodiment, the external device 300 may be any one of an audio device 310, an image output device 320 including at least one of a set-top box (STB), a digital video recorder (DVR), and a blue-ray player, a lighting device 330, a washing machine 340, and an air conditioner 350, but the present invention is not limited thereto.

Figure 2:
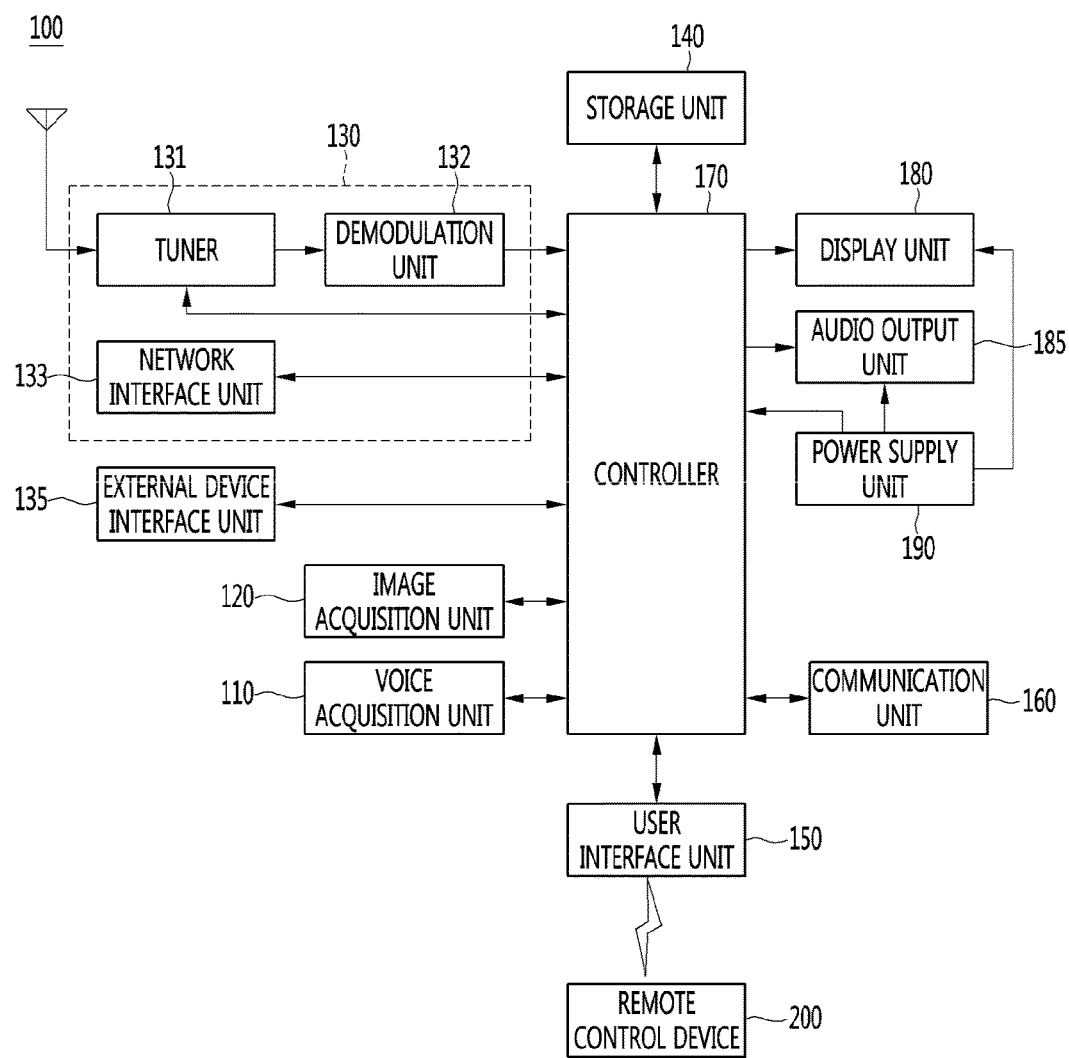
FIG. 2 is a block diagram illustrating a configuration of an image display device according to an embodiment of the present invention.

FIG. 2 is a block diagram illustrating a configuration of an image display device according to an embodiment of the present invention.

Referring to FIG. 2, the image display device 100 may include a voice acquisition unit 110, an image acquisition unit 120, a broadcast receiving unit 130, an external device interface unit 135, a storage unit 140, a user input interface unit 150, a communication unit 160, a controller 170, a display unit 180, an audio output unit 185, and a power supply unit 190.

The voice acquisition unit may acquire voices.

The voice acquisition unit may include at least one microphone, to acquire a voice through the microphone included therein.

Also, the voice acquisition unit 110 may transmit the acquired voice to the controller 170.

The image acquisition unit 120 may acquire images.

The image acquisition unit 120 may include at least one camera, to acquire an image through the camera included therein.

Also, the image acquisition unit 120 may transmit the acquired image to the controller 170.

Meanwhile, the broadcast receiving unit 120 may include a tuner 131, a demodulation unit 132, and a network interface unit 133.

The external device interface unit 135 may receive an application or application list within an adjacent external device, and transmit the received application or application list to the controller 170 or the storage unit 140.

The external device interface unit 135 may include a terminal for connection to an external device, to be connected to the connector of the external device.

The external device interface unit 135 may supply power, as drive power, supplied from the power supply unit 190, to the connected external device.

Also, the external device interface unit 135 may transmit an operating signal transmitted from the external device to the controller 170.

On the contrary, the external device interface unit 135 may transmit a voice signal transmitted from the controller 170 to the connected external device.

Meanwhile, the external device interface unit 135 may include a sensor capable of sensing connection to an external device, to recognize the connection to the external device.

The network interface unit 133 may provide an interface for connecting the image display device 100 to a wired/wireless network including an Internet network. The network interface unit 133 may transmit or receive data to or from another user or another electronic device through an accessed network or another network linked with the accessed network.

Also, the network interface unit 133 may transmit partial content data stored in the image display device 100 to another user previously registered with the image display device 100, a user of one selected from other electronic devices, or the selected electronic device.

The network interface unit 133 may access a predetermined web page through an accessed network or another network linked with the accessed network. That is, the network interface unit 133 may transmit or receive data to or from a corresponding server by accessing the predetermined web page through the network.

Also, the network interface unit 133 may receive contents or data provided by a content provider or network operator. That is, the network interface 133 may receive contents such as movies, advertisements, games, VODs, and broadcasting signals, provided by content providers or network providers, and information related to the contents through the network.

Also, the network interface unit 133 may receive update information and update files, provided by network operators, and transmit data to the Internet, content providers, or network operators.

The network interface unit 133 may select and receive, through the network, a desired application from among applications opened in public.

The storage unit 140 may store programs for processing and controlling signals inside the controller 170, and store signal-processed images, voices or data signals.

Also, the storage unit 140 may perform functions of temporarily storing images, audios, or data signals input from the external device interface unit 135 or the network interface unit 133, or may store information on predetermined images through a channel memory function.

The storage unit 140 may store applications or application lists input from the external device interface unit 135 or the network interface unit 133.

The image display device 100 may play content files (moving image files, still image files, music files, document files, application files, etc.) stored in the storage unit 140, and provide the played content files to the user.

The storage unit 140 may store information on a fingerprint of the user and information on a preference setting of the user. Here, the information on the fingerprint of the user may include information on fingerprints of a plurality of users, and the information on the preference setting of the user may include information on preference setting values of a plurality of users with respect to a plurality of devices.

The user input interface unit 150 may deliver signals input by the user to the controller 170 or deliver signals from the controller 170 to the user. For example, the user input interface unit 150 may receive and process control signals such as power on/off, channel selection, or screen setting from a remote control device 200 in various communication schemes such as a Bluetooth, ultra wideband (WB), Zigbee, radio frequency (RF), or infrared (IR) communication scheme, or process and transmit control signals from the controller 170 to the remote control device 200.

Also, the user input interface unit 150 may deliver control signals input from a local key such as a power key, channel key, volume key, or setting key to the controller 170.

The communication unit 160 may include at least one module that enables wired or wireless communication between the image display device 100 and a network or between the image display device 100 or a peripheral device. Here, the peripheral device may include at least one of the remote control device 200 and the external device 300, which will be described later.

As an example, the communication unit 160 may include an Internet module for Internet access, and enables the image display device 100 to access the Internet through wired or wireless communication using the Internet module.

As another example, the communication unit 160 may include a short-range communication module that enables wireless communication between the image display device 100 and another device. For example, the short-range communication module included in the communication unit 160 may use Bluetooth, radio frequency identification (RFID), infrared data association (IrDA), ultra wideband (UWB), ZigBee, wireless LAN (WLAN), Wi-Fi, near field communication (NFC), or the like.

An image signal image-processed by the controller 170 may be input to the display unit 180 to be displayed as an image corresponding to the image signal. In addition, the image signal image-processed by the controller 170 may be input to an external output device through the external device interface unit 135.

A voice signal processed by the controller 170 may be output to the audio output unit 185. In addition, the audio signal processed by the controller 170 may be input to the external output device through the external device interface unit 135.

Besides, the controller 170 may control overall operations inside the image display device 100.

The controller 170 may receive a sensing signal for connection to the external device from the external device interface unit 135, and control the power supply unit 190 to deliver drive power to the external device connected through the external device interface unit 135.

Also, the controller 170 may recognize a voice acquired through the voice acquisition unit 110, thereby performing a control operation corresponding to the recognized voice.

Also, the controller 170 may compare a plurality of voice signals in voices of the user, and recognize a voice of a voice signal having the highest quality, thereby performing a control operation corresponding to the recognized voice.

The controller 170 may determine a position of the user by comparing a plurality of voices acquired from the voice acquisition unit 110 having a plurality of microphones. Specifically, the controller 170 may determine a position of the user who speaks a voice by comparing voices acquired from the respective microphones.

Meanwhile, the controller 170 may control the image display device 100 by using user commands input through the user input interface unit 150 or an internal program, and access the network to allow the user to download desired applications or application lists to the image display device 100.

The controller 170 may allow channel information selected by the user, together with processed image or voice signals, to be output through the display unit 180 or the audio output unit 185.

Also, the controller 170 may allow image signals or audio signals received through the external device interface unit 135 from external devices, e.g., cameras or camcorders to be output through the display unit 180 or the audio output unit 185 according to external device image playback commands received through the user input interface unit 150.

Meanwhile, the controller 170 may control the display unit 180 to display an image and, for example, control to allow a broadcast image input through the tuner 131, an external input image input through the external device interface unit 135, an image input through the network interface unit 133, or an image stored in the storage unit 140 to be displayed on the display unit 180. In this case, the image displayed on the display unit 180 may be a still image or a moving image, and may be a 2D or 3D image.

Also, the controller 170 may control to allow a content stored in the image display device 100, a received broadcast content, or an external input content input from outside to be played. The content may have various types such as a broadcast image, an external input image, an audio file, a still image, an accessed wed screen, and a document file.

Also, the controller 180 may recognize a user, based on received information on a fingerprint image or finger print of the user. Also, the controller 170 may acquire user setting information corresponding to the recognized user.

The display unit 180 may convert, into an RGB signal, each of an image signal, a data signal, or an on-screen display (OSD) signal processed by the controller 170, or an image signal or data signal received through the external device interface unit 135, and generate a drive signal.

Meanwhile, the image display device 100 illustrated in FIG. 2 is merely an embodiment, and therefore, some of illustrated elements may be integrated, added, or omitted according to specifications of the image display device 100 actually implemented.

That is, two or more elements may be integrated into one or one element is divided into two or more elements, if necessary. In addition, a function performed in each block is for explaining an embodiment and a detailed operation or device thereof does not limit the scope of the present invention.

According to another embodiment of the present invention, the image display device 100 may not include the tuner 131 and the demodulation unit 132, differently from as shown in FIG. 2, and may receive an image through the network interface unit 133 or the external device interface unit 135 and play the image.

For example, the image display unit 100 may be implemented as divided into an image processing device such as a set-top box for receiving broadcast signals or contents according to various network services and a content playback device playing contents input from the image processing device.

In this case, an image display method according to an embodiment described hereinafter may be performed by not only the image display device 100 as described in relation to FIG. 2, but also any one of an image processing device such as the divided set-top box or the content playback device including the display unit 180 and the audio output unit 185.

Next, a remote control device according to an embodiment of the present invention will be described with reference to FIGS. 3 and 4.

Figure 3:
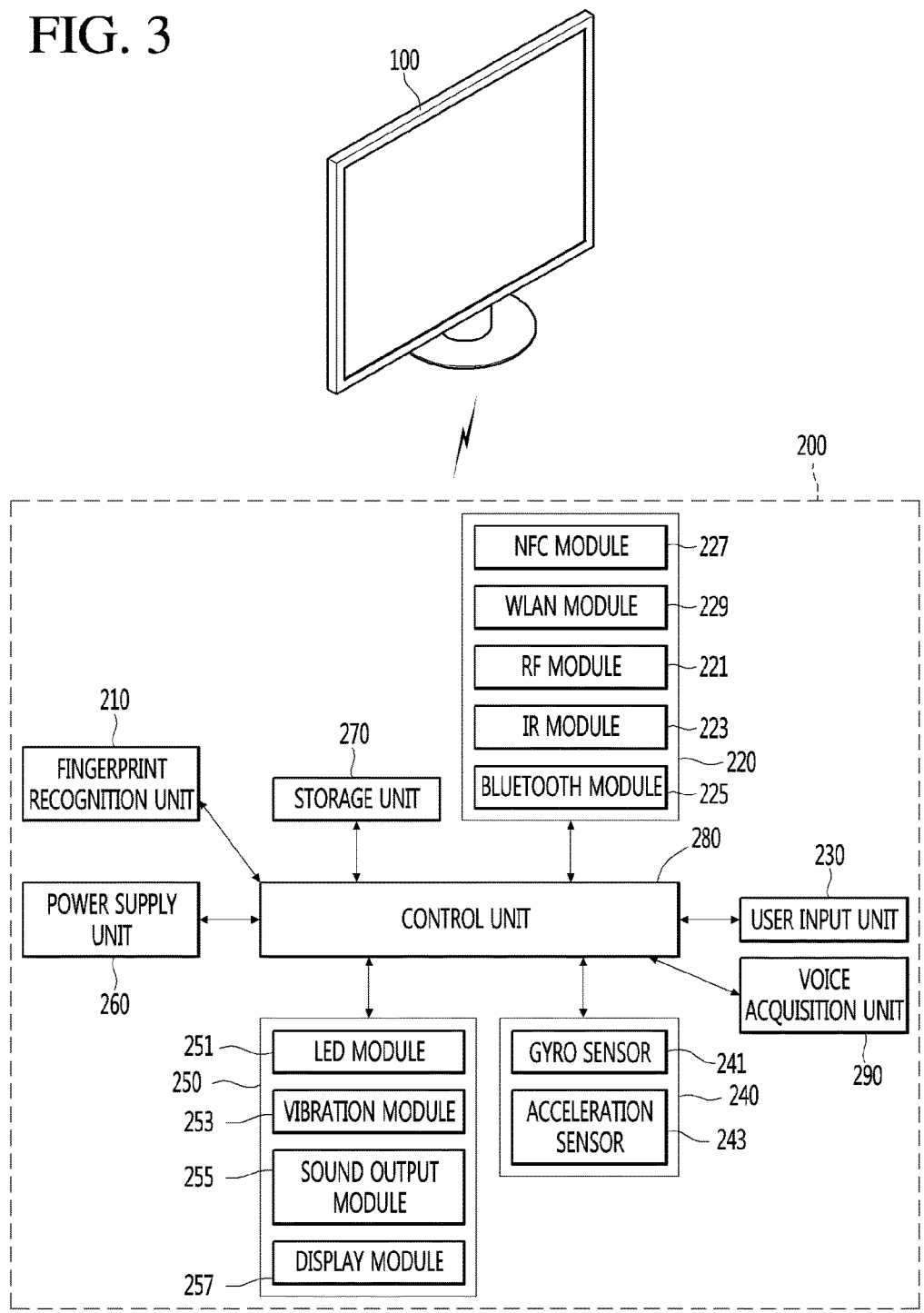
FIG. 3 is a block diagram of a remote control device according to an embodiment of the present invention.

FIG. 3 is a block diagram of a remote control device according to an embodiment of the present invention. FIG. 4 illustrates an actual configuration example of the remote control device 200 according to an embodiment of the present invention.

First, referring to FIG. 3, the remote control device 200 may include a fingerprint recognition unit 210, a wireless communication unit 220, a user input unit 230, a sensor unit 240, an output unit 250, a power supply unit 260, a storage unit 270, a controller 280, and a voice acquisition unit 290.

Referring to FIG. 3, the fingerprint recognition unit 210 may receive a fingerprint input by a user. Also, the fingerprint recognition unit 210 may recognize the input fingerprint.

The wireless communication unit 220 may transmit and receive signals with an arbitrary one of the image display devices according to the embodiments of the present invention described above.

The remote control device 200 may include an RF module 221 capable of transmitting and receiving signals with the image display device 100 or the external device 300 according to RF communication specifications and an IR module 223 capable of transmitting and receiving signals with the image display device 100 or the external device 300 according to IR communication specifications. Also, the remote control device 200 may include a Bluetooth module 225 capable of transmitting and receiving signals with the image display device 100 or the external device 300 according to Bluetooth communication specifications. Also, the remote control device 200 may include an NFC module 227 capable of transmitting and receiving signals with the image display device 100 or the external device 300 according to NFC communication specifications and a WLAN module 229 capable of transmitting and receiving signals with the image display device 100 or the external device 300 according to WLAN communication specifications.

Also, the remote control device 200 may transmit a signal containing information on movement, etc. of the remote control device 200 to the image display device 100 or the external device 300 through the wireless communication unit 220.

Meanwhile, the remote control device 200 may receive a signal transmitted from the image display device 100 or the external device 300 through the wireless communication unit 220, and transmit commands including power on/off, channel change, or volume change to the display device 100 or the external device 300 through the wireless communication unit 220, if necessary.

The user input unit 230 may include a keypad, a button, a touch pad, or a touch screen. The user may manipulate the user input unit 230 and input commands related to the display device 100 or the external device 300 to the remote control device 200. When the user input unit 230 includes a hard key button, the user may input commands related to the display device 100 or the external device 300 to the remote control device 200 through a push operation on the hard key button. This will be described with reference to FIG. 4.

Figure 4:
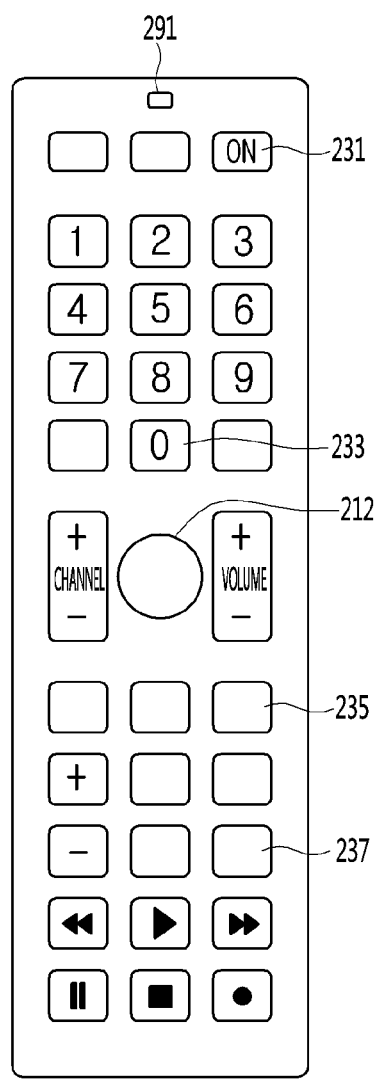
FIG. 4 illustrates an actual configuration example of the remote control device according to an embodiment of the present invention.

Referring to FIG. 4, the remote control device 200 may include a plurality of buttons. The plurality of buttons may include a fingerprint recognition button 212, a power button 231, a channel button 233, a voice recognition button 235, and a LIVE button 237.

The fingerprint recognition button 212 may be a button for recognizing a fingerprint of a user. In an embodiment, the fingerprint recognition button 212 allows a push operation to be performed thereon, and may receive a push operation and a fingerprint recognition operation.

The power button 231 may be a button for turning on/off power of the image display device 100 or the external device 300.

The channel button 233 may be a button for receiving a broadcasting signal on a specific broadcast channel.

The voice recognition button 235 may be a button for recognizing a voice of the user.

The LIVE button 237 may be a button for displaying a real-time broadcasting program.

Again, FIG. 3 will be described.

When the user input unit 230 includes a touch screen, the user may input commands related to the image display device 100 or the external device 300 to the remoter control device 200 by touching soft keys on the touch screen. In addition, the user input unit 230 may include various kinds of input means that the user may manipulate, such as a scroll key or a jog key, but the embodiment does not limit the scope of the present invention.

The sensor unit 240 may include a gyro sensor 241 or an acceleration sensor 243, and the gyro sensor 241 may sense information on movement of the remote control device 200.

For example, the gyro sensor 241 may sense the information on the movement of the remote control device 200 on the basis of x, y, and z axes, and the acceleration sensor 243 may sense information on a moving velocity of the remote control device 200. Meanwhile, the remote control device 200 may further include a distance measuring sensor, to measure a distance to the display unit 180 of the display device 100.

The output unit 250 may output an image or voice signal corresponding to manipulation of the user input unit 230 or corresponding to a signal transmitted from the image display device 100. The user may perceive, through the output unit 250, whether the user input unit 230 is manipulated or whether the image display device 100 is controlled.

For example, the output unit 250 may include an LED module 251 turned on, a vibration module 253 generating vibration, a sound output module 255 outputting a sound, or a display module 257 outputting an image, when the user input unit 230 is manipulated or a signal is transmitted or received to or from the image display device 100 or the external device 300 through the wireless communication unit 220.

In addition, the power supply unit 260 may supply power to the remote control unit 200, and reduce power consumption by stopping the supply of power when the remote control device 200 does not move for a predetermined time. The power supply unit 260 may resume the supply of power when a predetermined key included in the remote control device 200 is manipulated.

The storage unit 270 may store various kinds of programs necessary for controlling or operating the remote control device 200, and application data, etc. When the remote control device 200 wirelessly transmits and receives signals to and from the image display device 100 or the external device 300 through the RF module 221, the remote control device 200 transmits and receives signals with the image display device 100 or the external device 300 through a predetermined frequency band.

The controller 280 of the remote control device 200 may store, in the storage unit 270, and refer to information on a frequency band in which signals are wirelessly transmitted and received to and from the image display device 100 or the external device 300 paired with the remote control device 200.

The controller 280 controls overall operations of the remote control device 200. The controller 280 may transmit signals corresponding to manipulation of a predetermined key of the user input unit 230 or signals corresponding to movement of the remote control device 200, which is sensed by the sensor unit 240, to the display device 100 through the wireless communication unit 220.

In addition, the voice acquisition unit 290 of the remote control device 200 may acquire voices.

The voice acquisition unit 290 may include at least one microphone 291, to acquire a voice through the microphone 291 included therein.

Also, the voice acquisition unit 290 may deliver the acquired voice to the controller 280.

Referring to FIG. 4, the voice acquisition unit 290 may include a microphone 291 provided at a front surface of the remote control device 200, to acquire a voice through the microphone 291.

Also, the voice acquisition unit 290 may include a plurality of microphones 291, to acquire a voice through each of the plurality of microphones 291.

In an embodiment, as one or more microphones 291 are provided at one or more of front, side, and rear surfaces of the remote control device 200, the voice acquisition unit 290 may acquire voices through the one or more microphones 291.

Hereinafter, an operating method of the remote control device 200 will be described with reference to FIGS. 5 to 7.

Figure 5:
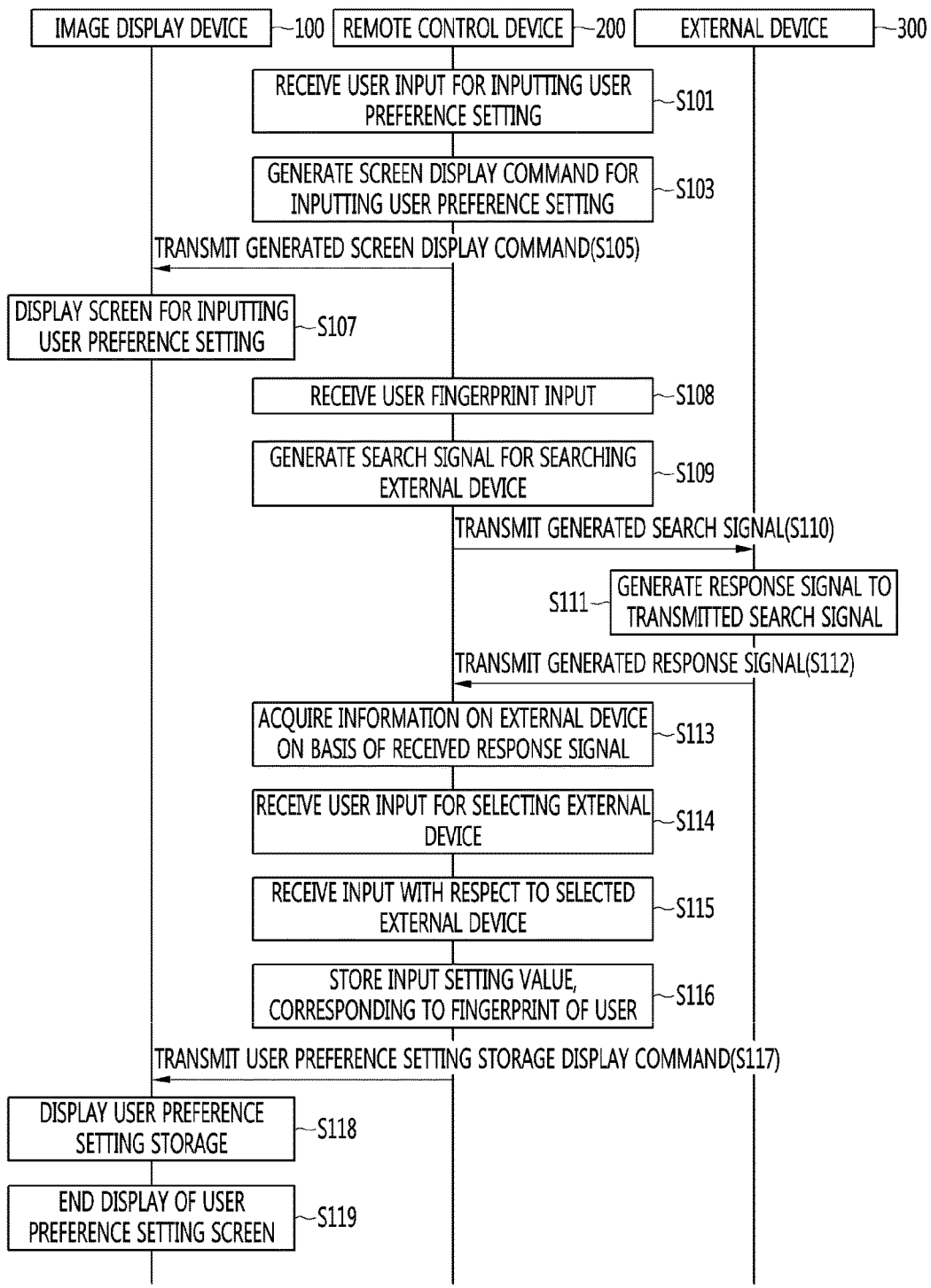
FIG. 5 is a ladder diagram illustrating an operating method of the remote control device according to an embodiment of the present invention.

FIG. 5 is a ladder diagram illustrating an operating method of the remote control device 200 according to an embodiment of the present invention.

Figure 6:
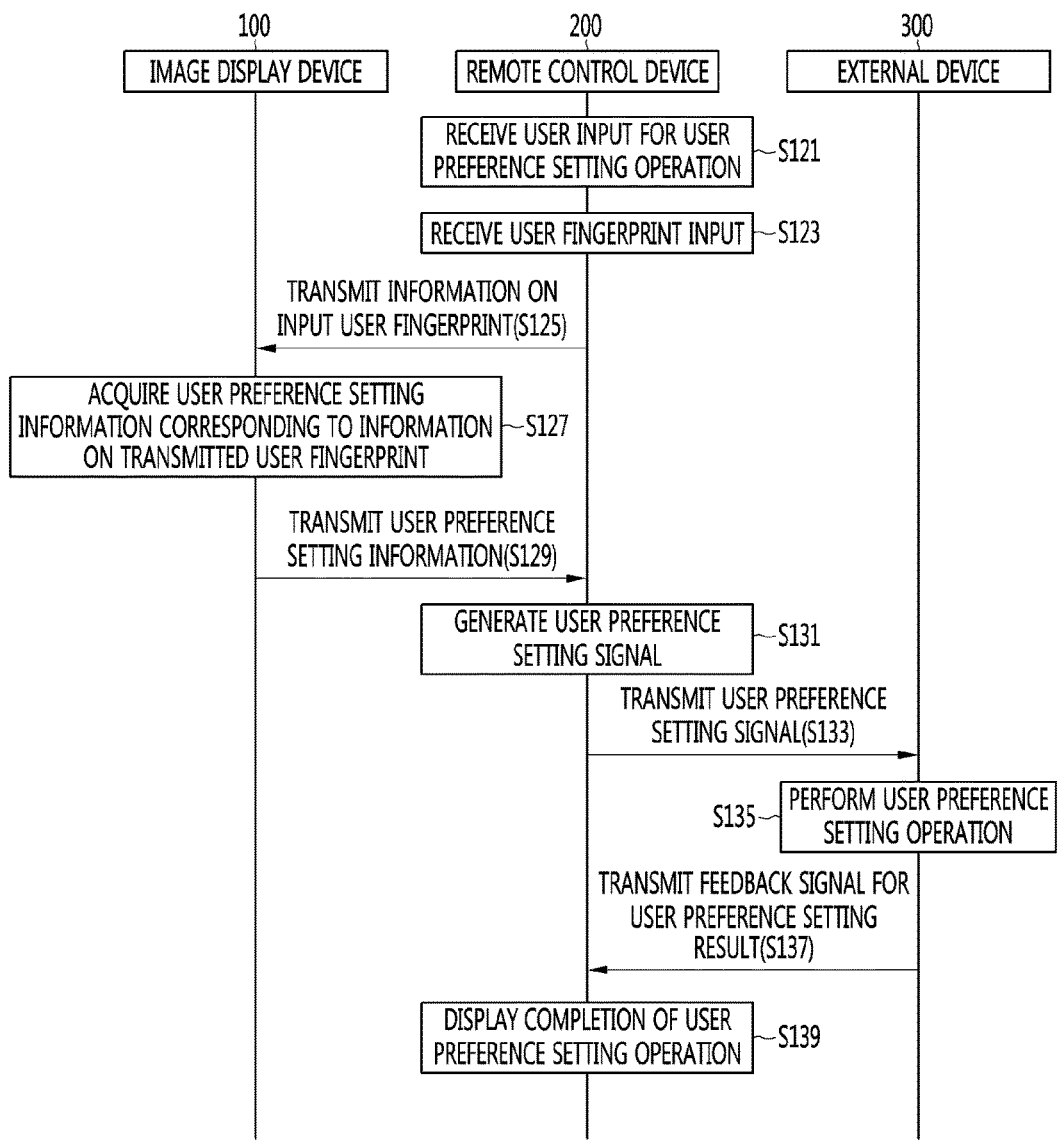
FIG. 6 is a ladder diagram illustrating an operating method of the remote control device according to another embodiment of the present invention.

FIG. 6 is a ladder diagram illustrating an operating method of the remote control device 200 according to another embodiment of the present invention.

Figure 7:
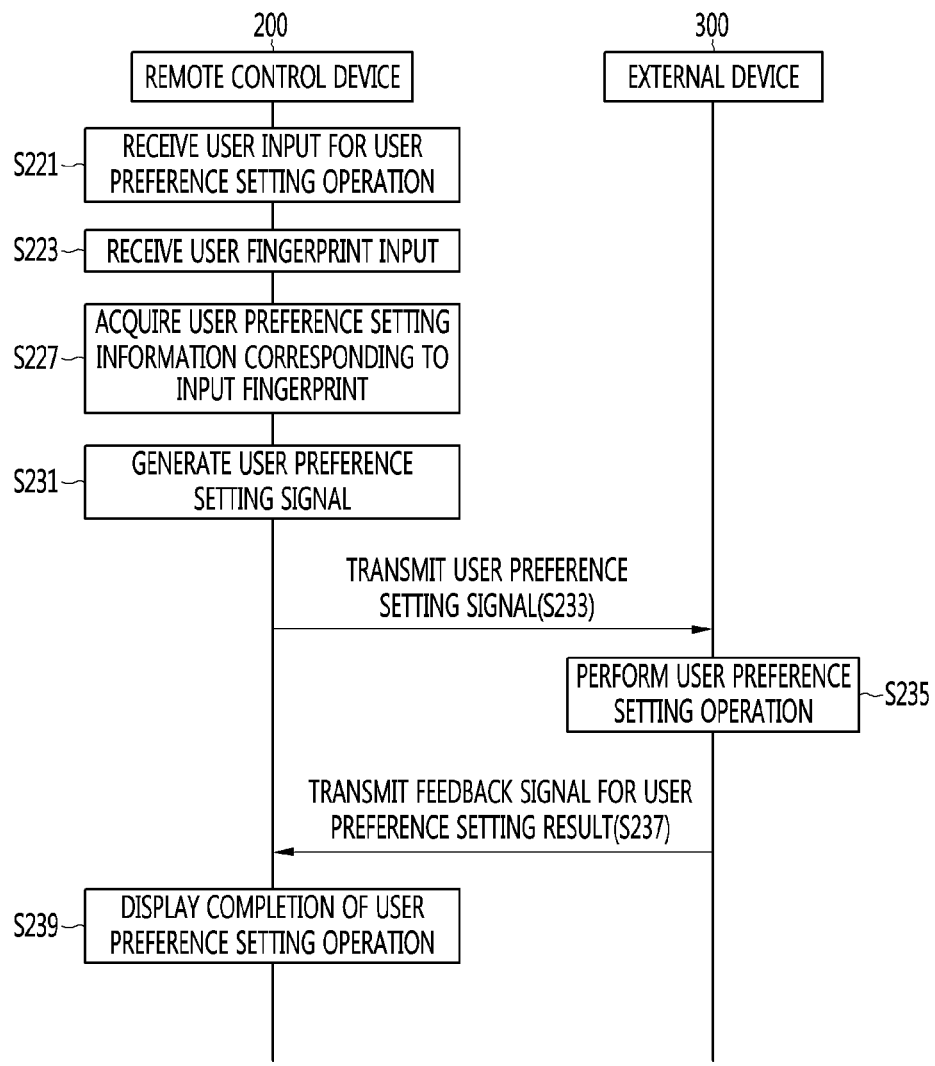
FIG. 7 is a ladder diagram illustrating an operating method of the remote control device according to still another embodiment of the present invention.

FIG. 7 is a ladder diagram illustrating an operating method of the remote control device 200 according to still another embodiment of the present invention.

An operation of inputting a user preference setting according to an embodiment of the present invention will be described with reference to FIG. 5.

Referring to FIG. 5, the controller 280 of the remote control device 200 receives a user input for inputting a user preference setting (S101).

The remote control device 200 may receive, from a user, a user input for inputting a user preference setting of the user with respect to at least one of image display devices 100 and external devices 300. Here, the user preference setting may mean a user setting of various setting values with respect to operations of the image display devices 100 and the external devices 300.

In an embodiment, the remote control device 200 may receive a user input through the user input unit 230 as the user input for inputting the user preference setting.

In another embodiment, the remote control device 200 may receive a user voice through the voice acquisition unit 290 as the user input for inputting the user preference setting.

The remote control device 200 generates a screen display command for inputting the user preference setting (S103).

The remote control device 200 may generate a screen display command for displaying a screen for inputting the user preference setting. The screen for inputting the user preference setting may be a screen for displaying information on the user preference setting on a display included in at least one of the image display devices 100 and the external devices 300.

In an embodiment, the remote control device 200 may generate a screen display command for allowing the image display device 100 to display a screen for inputting the user preference setting.

In another embodiment, the remote control device 200 may generate a screen display command for allowing the external device 300 to display a screen for inputting the user preference setting.

The controller 280 of the remote control device 200 transmits the generated screen display command to the image display device 100 or the external device 300 (S105).

The remote control device 200 may transmit the generated screen display command to at least one of the image display devices 100 and the external devices 300, corresponding to the generated screen display command.

Specifically, the controller 280 of the remote control device 200 may transmit the generated screen display command to the image display device 100 or the external device 300 through the wireless communication unit 220. In addition, the remote control device 200 may transmit, through the wireless communication unit 220, a screen display command corresponding to communication specifications supported by the image display device 100 or the external device 300 that receives the screen display command.

If the screen display command is received, the image display device 100 displays a screen for inputting the user preference setting (S107).

If the screen display command is received from the remote control device 200, the controller 170 of the image display device 100 may display a screen for inputting the user preference setting on the display unit 180.

Meanwhile, when the remote control device 200 transmits the screen display command to the external device 300, the external device 300 receiving the screen display command may display a screen for inputting the user preference setting on a display (not shown) included in the external device 300.

In addition, if the screen for inputting the user preference setting is displayed, the image display device 100 or the external device 300 may transmit, to the remote control device 200, a response signal notifying that the screen for inputting the user preference setting has been displayed.

The controller 280 of the remote control device 200 receives a user fingerprint input for recognizing a fingerprint of the user (S108).

The remote control device 200 may receive, from the user, a user input for recognizing a fingerprint of the user. In an embodiment, the remote control unit 200 may receive the user input for recognizing the fingerprint of the user through the fingerprint recognition button 222.

This will be described in FIGS. 8 and 9.

Figure 8:
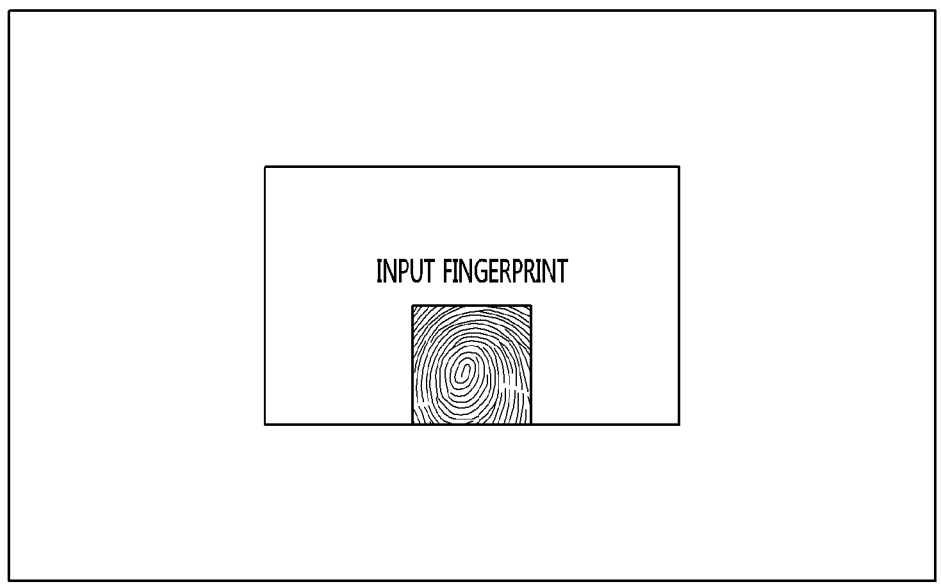
FIG. 8 illustrates a screen on a user fingerprint input according to an embodiment of the present invention.

FIG. 8 illustrates a screen on a user fingerprint input according to an embodiment of the present invention.

Figure 9:
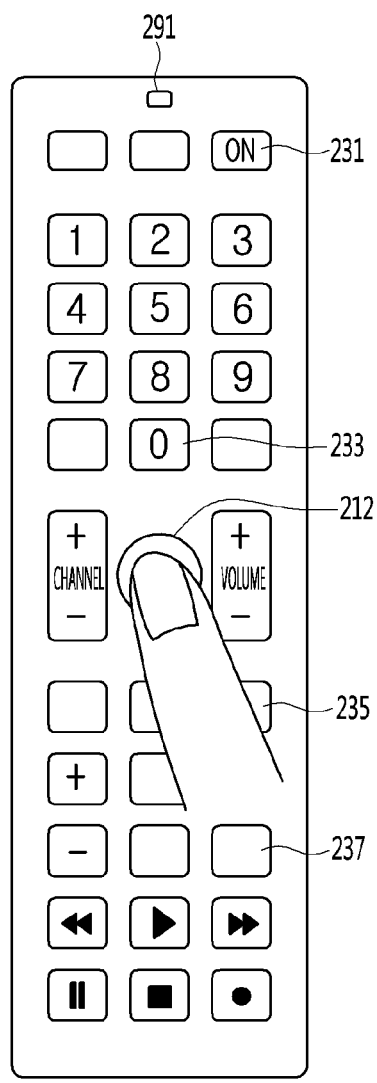
FIG. 9 is an exemplary diagram of a user fingerprint input according to an embodiment of the present invention.

FIG. 9 is an exemplary diagram of a user fingerprint input according to an embodiment of the present invention.

Referring to FIG. 8, at least one of image display devices 100 and external devices 300 may display a screen representing a user fingerprint input for recognizing a fingerprint of a user. The remote control device 200 may transmit a control signal for displaying the screen representing the user fingerprint input to at least one of the image display device 100 and the external device 300, associated therewith. Accordingly, at least one of the image display devices 100 and the external devices 300 may display the screen representing the user fingerprint input on the display unit 180 or the display (not shown).

Referring to FIG. 9, the remote control device 200 may receive a user input for recognizing a fingerprint of a user through the fingerprint recognition button 212. Accordingly, the remote control device 200 may receive the user input for recognizing the fingerprint of the user through the fingerprint recognition button 212.

In addition, the controller 280 of the remote control device 200 may recognize the input fingerprint of the user.

Meanwhile, if the user input for recognizing the fingerprint of the user is received, the controller 280 of the remote control device 200 may output, through the output unit 250, an image or voice notifying that the user input for recognizing the fingerprint of the user has been received.

Again, FIG. 5 will be described.

The controller 280 of the remote control device 200 generates a search signal of searching external devices (S109).

The controller 280 of the remote control device 200 may generate a search signal for searching external devices 300 controllable by the remote control device 200.

Meanwhile, the controller 280 may generate a search signal corresponding to each of a plurality of communication schemes. For example, the controller 280 may generate a search signal corresponding to at least one communication scheme among Bluetooth, radio frequency identification (RFID), infrared data association (IrDA), ultra wideband (UWB), ZigBee, wireless LAN (WLAN), Wi-Fi, and near field communication (NFC). Accordingly, the controller 280 may generate a plurality of search signals respectively corresponding to the plurality of communication schemes.

The controller 280 of the remote control device 200 transmits the generated search signal to the external devices 300 (S110).

The controller 280 of the remote control device 200 may transmit the generated search signal to at least one external device 300 through the wireless communication unit 220. In an embodiment, the controller 280 may transmit the search signal to the external devices 300 through the wireless communication unit 220. Accordingly, the controller 280 may transmit, to the external devices 300, a plurality of search signals respectively corresponding to the plurality of communication schemes.

In another embodiment, the controller 280 may transmit the search signal to an external device 300 within a predetermined distance from the remote control device 200. Accordingly, if the user performs an operation of tagging the remote control device 200 to the external device 300, the controller 280 of the remote control device 200 may transmit the generated search signal to the external device 300.

Specifically, the controller 280 of the remote control device 200 may transmit the generated search signal to the external device 300 within the predetermined distance through a non-contact proximity wireless communication technique.

The external device 300 generates a response signal to the transmitted search signal (S111).

The external device 300 may receive a search signal transmitted from the remote control device 200 and generate a response signal to the received search signal.

The external device 300 may generate a response signal including information on the external device 300 receiving the search signal. For example, the external device 300 may generate a response signal including information on at least one of a kind, an available communication scheme, a control code, and an operation state of the external device 300 receiving the search signal.

The external device 300 transmits the generated response signal to the remote control device 200 (S112).

The external device 300 may transmit the generated response signal to the remote control device 200, and the remote control device 200 may receive the transmitted response signal through the wireless communication unit 220.

In an embodiment, the external device 300 may transmit a response signal corresponding to at least one communication scheme among Bluetooth, radio frequency identification (RFID), infrared data association (IrDA), ultra wideband (UWB), ZigBee, wireless LAN (WLAN), Wi-Fi, and near field communication (NFC).

In another embodiment, the external device 300 may transmit the response signal to the remote control device 200 within the predetermined distance from the external device 300. Accordingly, if the user performs an operation of tagging the remote control device 200 to the external device 300, the external device 300 may transmit the generated response signal to the remote control device 200. Specifically, the external device 300 may transmit the generated response signal to the remote control device 200 within a certain distance through the non-contact proximity wireless communication technique. Meanwhile, the step S109 of transmitting the search signal and the step S112 of transmitting the response signal may be performed through a one-time tagging operation of the user.

The remote control device 200 acquires information on the external device on the basis of the received response signal (S113).

The controller 280 of the remote control device 200 may recognize the external device 300 transmitting the response signal on the basis of the response signal received from the external device 300, and acquire information on the recognized external device 300. Here, the information on the external device 300 may include information on at least one of a kind, a manufacturer, a product model name, an available communication scheme, a control code, and an operation state of the external device 300.

In an embodiment, the controller 280 of the remote control device 200 may acquire the information on the external device 300 transmitting the response signal from information on the external devices 300, previously stored in the storage unit 270.

In another embodiment, the controller 280 of the remote control device 200 may acquire the information on the external device 300 transmitting the response signal from a server 500 connected through the Internet.

In still another embodiment, the controller 280 of the remote control device 200 may acquire the information on the external device 300 transmitting the response signal from information included in the received response signal.

The description in which the remote control device 200 acquires the information on the external device 300 is an example, and the information on the external device 300 may be acquired in various manners according to selections of a user or designer. In addition to the external device 300, the remote control device 200 may search an image display devices 100 and acquire information on the searched image display device 100 through the above-described process.

The controller 280 of the remote control device 200 receives a user input for selecting an external device 300 (S114).

The controller 280 of the remote control device 200 may receive a user input for selecting an external device 300 that becomes a target of a user preference setting through the user input unit 230. Here, the external device 300 that becomes a target of the user preference signal may be an external device 300 transmitting a response signal. Also, the controller 280 may receive a user input for selecting at least one external device 300. Therefore, the controller 280 may receive a user input for selecting a plurality of external device 300.

This will be described with reference to FIG. 10.

Figure 10:
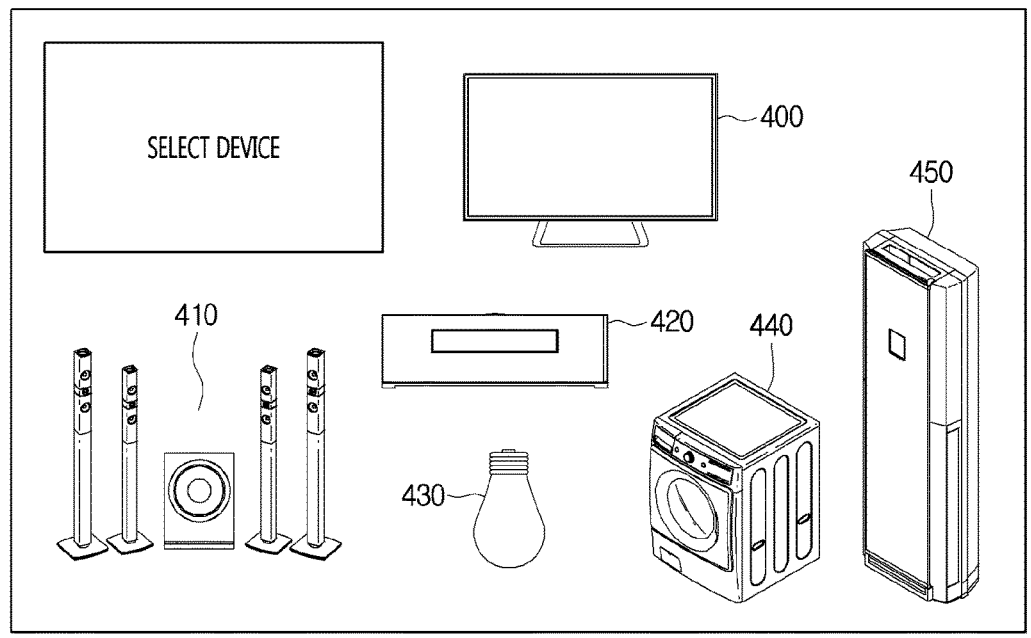
FIG. 10 illustrates selection of a device that becomes a target of a user preference setting according to an embodiment of the present invention.

FIG. 10 illustrates selection of a device that becomes a target of a user preference setting according to an embodiment of the present invention.

Referring to FIG. 10, the controller 280 of the remote control device 200 may transmit, to at least one of image display devices 100 and external devices 300, a control signal for displaying a screen for selecting a device that becomes a target of a user preference setting. Also, the controller 280 may receive a user input for selecting an external device 300 on the basis of the displayed screen.

In an embodiment, the controller 170 of the image display device 100 may display, on the display unit 180, a screen for selecting a device that becomes a target of a user preference setting. The controller 170 of the image display device 100 may display, on the display unit 180, a screen including an icon representing the device that becomes the target of the user preference setting. Accordingly, the controller 170 of the image display device 100 may display, on the display unit 180, an image display device icon 400, an audio device icon 410, an image output device icon 420, a lighting device icon 430, a washing machine icon 440, and an air conditioner icon 450, which indicate devices that become targets of the user preference setting. In addition, the controller 280 may receive a user input for selecting at least one of the displayed icons 400, 410, 420, 430, 440, and 450. The controller 280 may recognize a user input for selecting an external device 300 corresponding to the icon selected based on the user input.

Meanwhile, in addition to the external device 300, the remote control device 200 may select an image display device 100 and receive an input for a user preference setting with respect to the selected image display device 100 through the above-described process. This will be described later.

The controller 280 of the remote control device 200 receives an input for a user preference setting with respect to the selected external device 300 (S115).

The controller 280 of the remote control device 200 may receive an input for a user preference setting with respect to the selected external device 300 through the user input unit 230. Here, the user preference setting may mean a user setting of various setting values with respect to operations of the image display devices 100 and the external devices 300.

This will be described with reference to FIGS. 11 to 18.

The controller 280 of the remote control device 200 may receive a user input for selecting one of image display devices 100 and external devices 300, which becomes a target of the user preference setting. Here, the external devices 300 may include at least one of an audio device 310, an image output device 320, a lighting device 330, a washing machine 340, and an air conditioner 350.

If the user input for selecting the device that becomes the target of the user preference setting is received in step S114, the controller 280 of the remote control device 200 receive a user input for inputting a user preference setting with respect to selected device.

This will be described with reference to FIGS. 11 to 16.

FIGS. 11 to 16 illustrate input for a user preference setting value according to an embodiment of the present invention.

In an embodiment, if the image display device 100 is selected as a device that becomes a target of a user preference setting, the controller 280 of the remote control device 200 may receive a user input for inputting a user preference setting value with respect to the image display device 100.

Also, the controller 280 of the remote control device 200 may transmit, to at least one of the image display device 100 and the external devices 300, a screen for inputting the user preference setting value with respect to the image display device 100.

Figure 11:
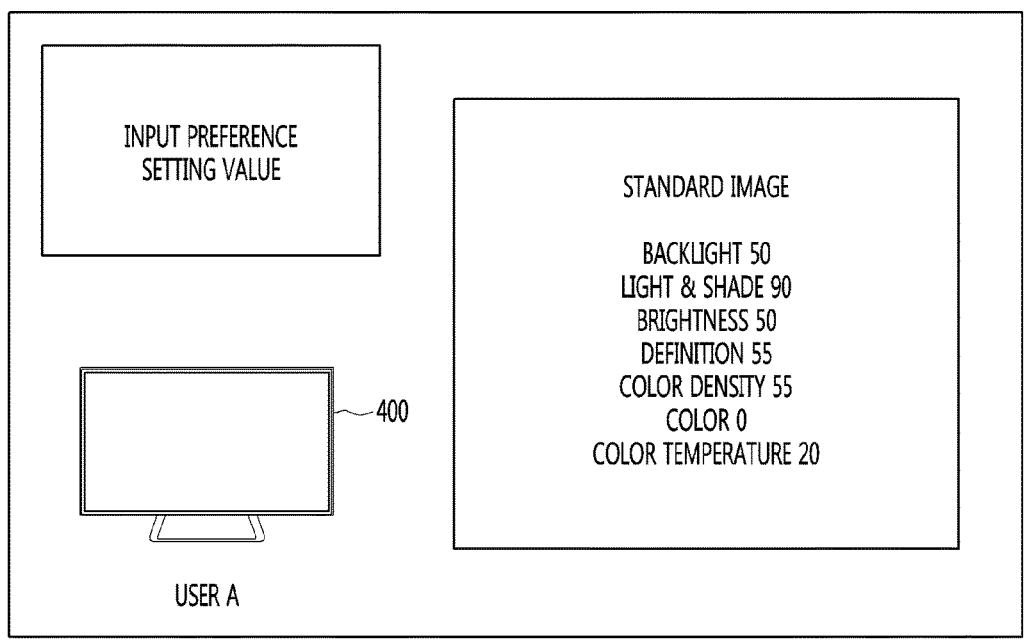
FIGS. 11 to 16 illustrate input for a user preference setting value according to an embodiment of the present invention.

Accordingly, as shown in FIG. 11, the controller 170 of the image display device 100 may display, on the display unit 180, the image display device icon 400 of the image display device 100 that becomes the target of the user preference setting and the input user preference setting vale of user A with respect to the image display device 100.

In another embodiment, if the audio device 310 is selected as a device that becomes the target of the user preference setting, the controller 280 of the remote control device 200 may receive a user input for inputting a user preference setting value with respect to the audio device 310.

In addition, the controller 280 of the remote control device 200 may transmit, to at least one of the image display device 100 and the external devices 300, a control signal for displaying a screen for inputting the user preference setting value with respect to the audio device 310.

Figure 12:
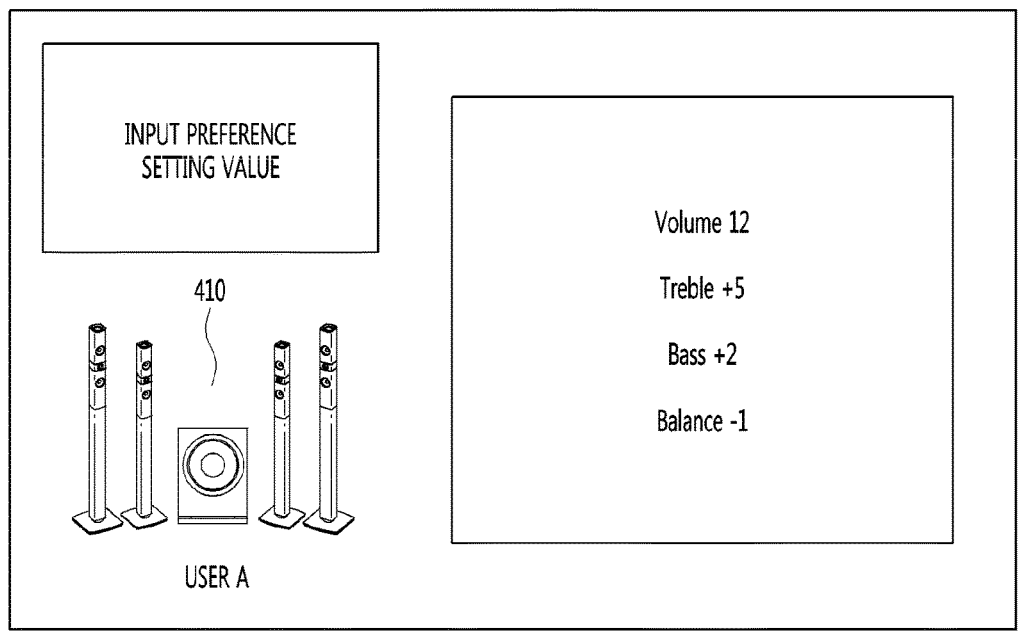

Accordingly, as shown in FIG. 12, the controller 170 of the image display device 100 may display, on the display unit 180, the audio device icon 410 of the audio device 310 that becomes the target of the user preference setting and the input user preference setting value of the user A with respect to the audio device 310.

In still another embodiment, if the image output device 320 is selected as a device that becomes the target of the user preference setting, the controller 280 of the remote control device 200, the controller 280 of the remote control device 200 may receive a user input for inputting a user preference setting value with respect to the image output device 320.

In addition, the controller 280 of the remote control device 200 may transmit, to at least one of the image display device 100 and the external devices 300, a control signal for displaying a screen for inputting the user preference setting value with respect to the image output device 320.

Figure 13:
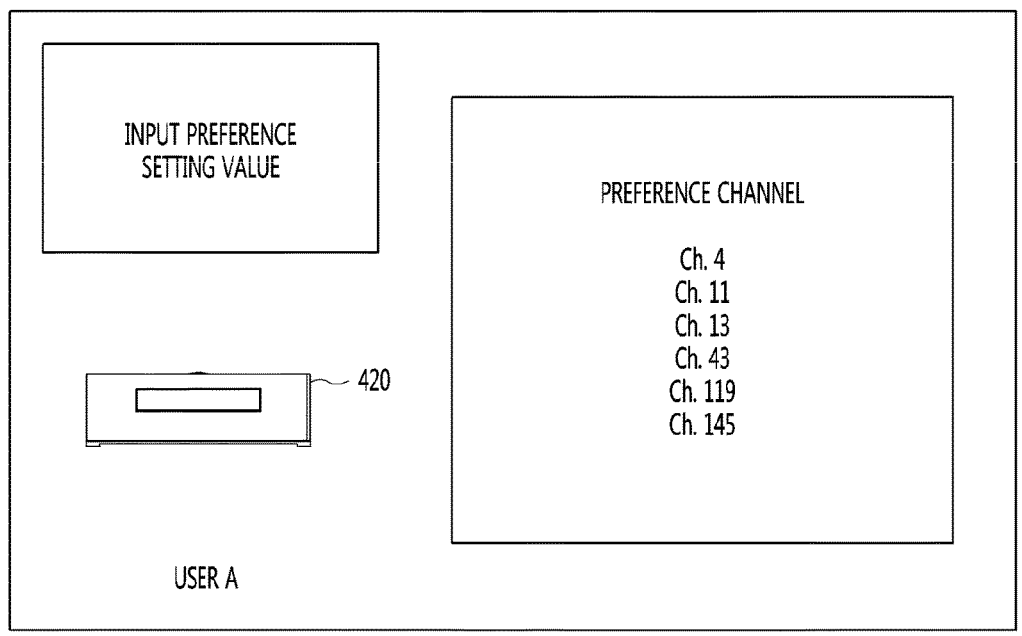

Accordingly, as shown in FIG. 13, the controller 170 of the image display device 100 may display, on the display unit 180, the image output device icon 420 of the image output device 320 that becomes the target of the user preference setting and the input user preference setting value of the user A with respect to the image output device 320.

In still another embodiment, if the lighting device 330 is selected as a device that becomes the target of the user preference setting, the controller 280 of the remote control device 200, the controller 280 of the remote control device 200 may receive a user input for inputting a user preference setting value with respect to the lighting device 330.

In addition, the controller 280 of the remote control device 200 may transmit, to at least one of the image display device 100 and the external devices 300, a control signal for displaying a screen for inputting the user preference setting value with respect to the lighting device 330.

Figure 14:
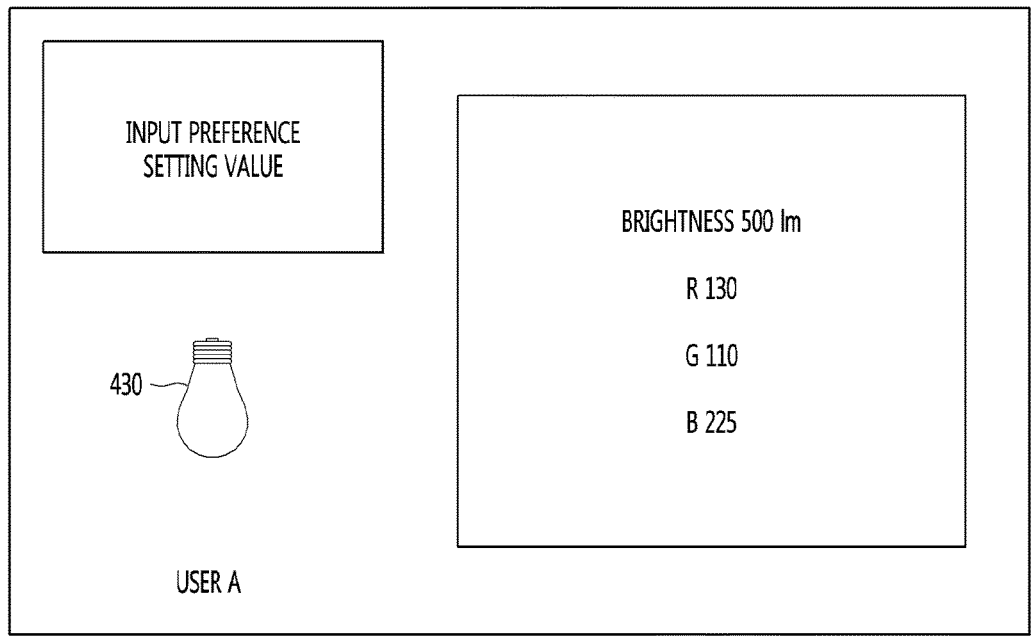

Accordingly, as shown in FIG. 14, the controller 170 of the image display device 100 may display, on the display unit 180, the lighting device icon 430 of the lighting device 330 that becomes the target of the user preference setting and the input user preference setting value of the user A with respect to the lighting device 330.

In still another embodiment, if the washing machine 340 is selected as a device that becomes the target of the user preference setting, the controller 280 of the remote control device 200, the controller 280 of the remote control device 200 may receive a user input for inputting a user preference setting value with respect to the washing machine 340.

In addition, the controller 280 of the remote control device 200 may transmit, to at least one of the image display device 100 and the external devices 300, a control signal for displaying a screen for inputting the user preference setting value with respect to the washing machine 340.

Figure 15:
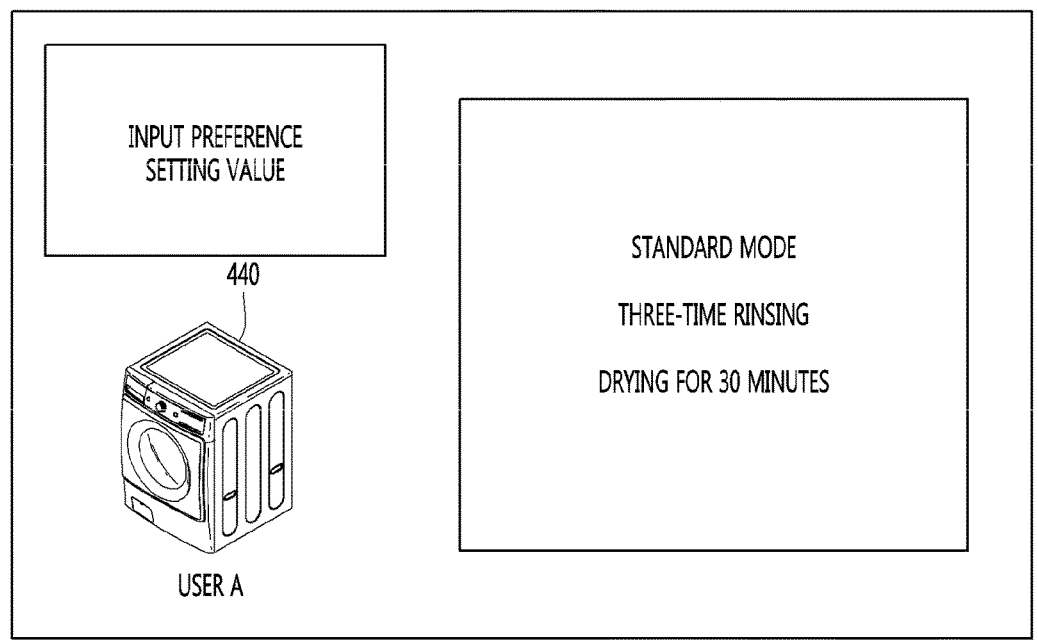

Accordingly, as shown in FIG. 15, the controller 170 of the image display device 100 may display, on the display unit 180, the washing machine icon 440 of the washing machine 340 that becomes the target of the user preference setting and the input user preference setting value of the user A with respect to the washing machine 340.

In still another embodiment, if the air conditioner 350 is selected as a device that becomes the target of the user preference setting, the controller 280 of the remote control device 200, the controller 280 of the remote control device 200 may receive a user input for inputting a user preference setting value with respect to the air conditioner 350.

In addition, the controller 280 of the remote control device 200 may transmit, to at least one of the image display device 100 and the external devices 300, a control signal for displaying a screen for inputting the user preference setting value with respect to the air conditioner 350.

Figure 16:
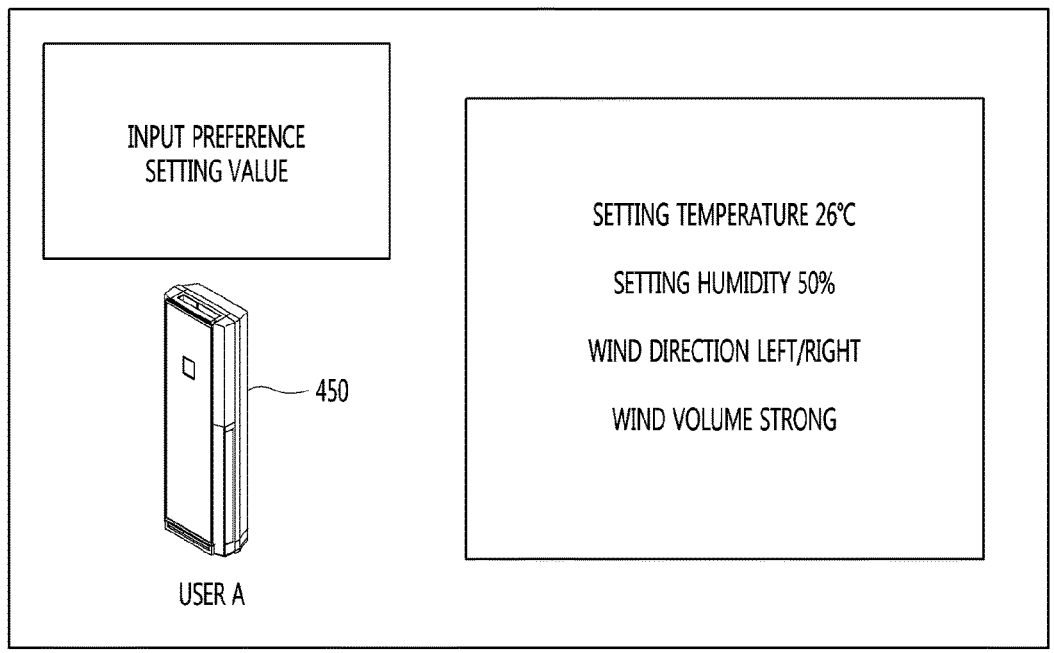

Accordingly, as shown in FIG. 16, the controller 170 of the image display device 100 may display, on the display unit 180, the air conditioner icon 450 of the air conditioner 350 that becomes the target of the user preference setting and the input user preference setting value of the user A with respect to the air conditioner 350.

Meanwhile, the description of the input for the user preference setting is merely an example for description, and the remote control device 200 may receive an input for a user preference setting with respect to each of a plurality of users.

In addition, the remote control device 200 may receive an input for a user preference setting with respect to each of fingerprints of a user. Accordingly, the remote control device 200 may receive an input for a user preference setting, corresponding to the fingerprint of the user, which is received in step S108.

Again, FIG. 5 will be described.

The remote control device 200 stores the input user preference setting, corresponding to the recognized fingerprint of the user (S116).

The controller 280 of the remote control device 200 may store a setting value for the input user preference setting, corresponding to the input fingerprint of the user. In an embodiment, the controller 280 of the remote control device 200 may store the user preference setting value of the user with respect to the selected device, corresponding to the recognized fingerprint of the user. In addition, the controller 280 of the remote control device 200 may store different user preference setting values, corresponding to fingerprints of a plurality of fingers of the user.

In another embodiment, the controller 280 of the remote control device 200 may store the user preference setting value of the user with respect to the selected device in the storage unit 140 of the image display device 100, corresponding to the recognized fingerprint of the user.

Meanwhile, the remote control device 200 may generate an acknowledgement signal of the input user preference setting value and transmit the generated acknowledgement signal to an external device 300 corresponding to the user preference setting value. The external device 300 receiving the acknowledgement signal may generate a response signal to the acknowledgement signal and transmit the generated response signal to the remote control device 200. In addition, the remote control device 200 may receive the response signal transmitted from the external device 300. If the response signal is received, the remote control device 200 may store the input user preference setting value.

The remote control device 200 may transmit a user preference setting storage display command to the image display device 100 or the external device 300 (S117).

The remote control device 200 may transmit the user preference setting storage display command for indicating that the user preference setting has been stored to the image display device 100 or the external device 300 through the wireless communication unit 220.

Specifically, the controller 280 of the remote control device 200 may transmit the user preference setting storage display command to the image display device 100 or the external device 300 through the wireless communication unit 220. In addition, the remote control device 200 may transmit, through the wireless communication unit 220, a screen display command corresponding to the communication scheme supported by the image display device 100 or the external device 300, which receives the user preference setting storage display command.

If the user preference setting storage display command is received, the image display device 100 or the external device 300 displays a screen notifying that the user preference setting has been stored (S118).

If the user preference setting storage display command is received from the remote control device 200, the controller 170 of the image display device 100 may display, on the display unit 180, a screen notifying that the user preference setting has been stored.

This will be described with reference to FIGS. 17 and 18.

Figure 17:
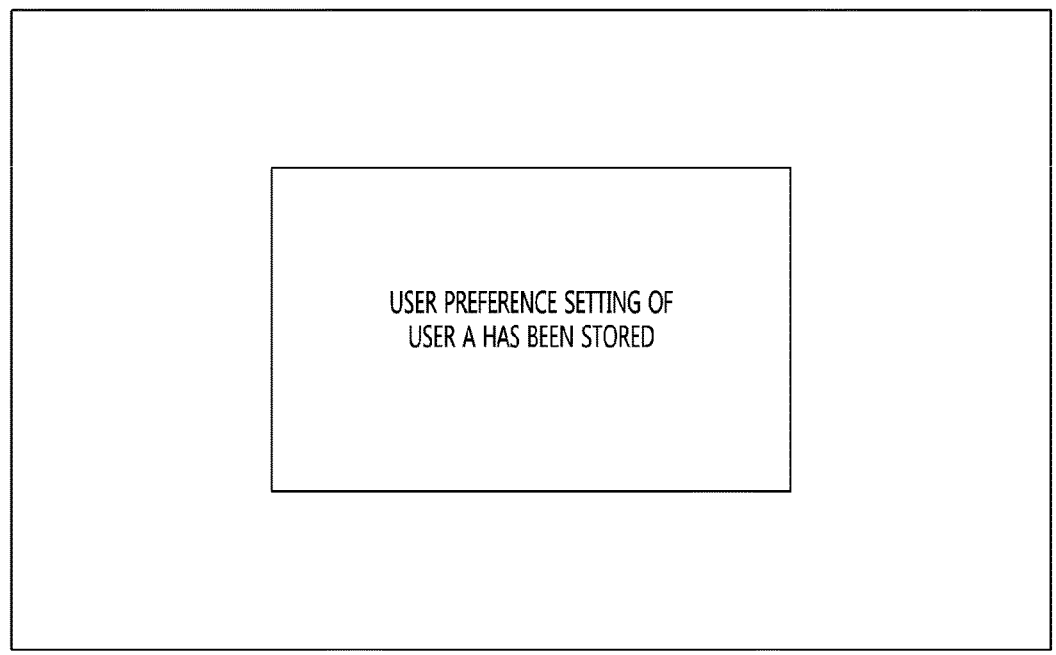
FIGS. 17 and 18 illustrate storage of a user preference setting according to an embodiment of the present invention.
Figure 18:
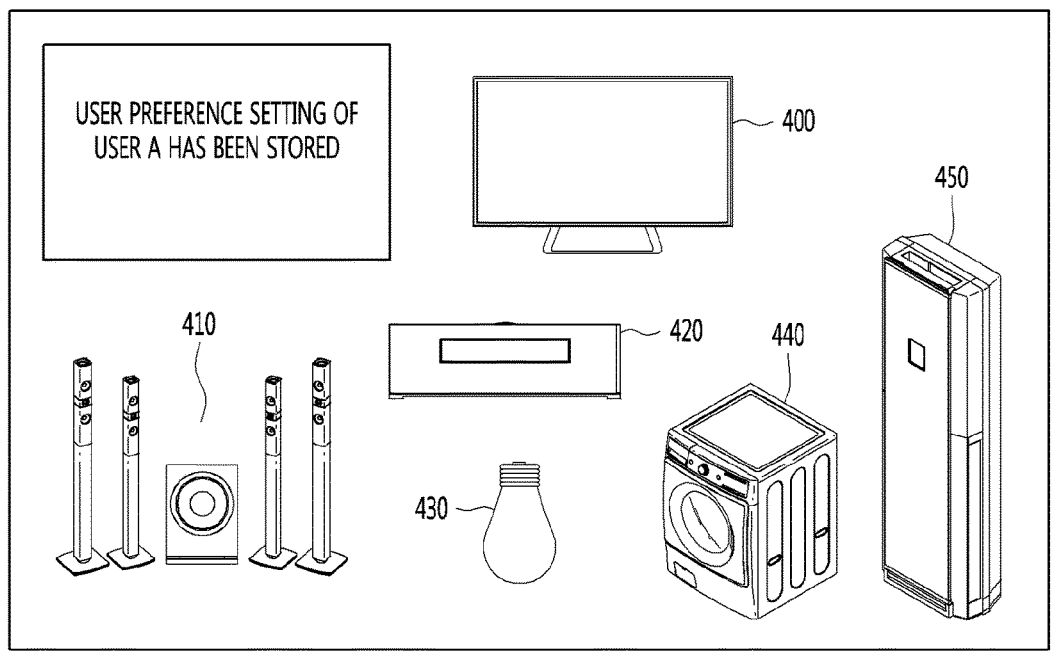

FIGS. 17 and 18 illustrate storage of a user preference setting according to an embodiment of the present invention.

Referring to FIG. 17, at least one of the image display device 100 and the external devices 300 may display a screen notifying that the user preference setting of the recognized user has been stored.

In addition, at least one of the image display device 100 and the external devices 300 may display information on a device that becomes the target of the user preference setting on the screen notifying that the user preference setting of the recognized user has been stored.

Referring to FIG. 18, at least one of the image display device 100 and the external devices 300 may display the icons 400, 410, 420, 430, 440, and 450 for indicating devices that become targets of the user preference setting on the screen notifying that the user preference setting of the recognized user has been stored. Accordingly, at least one of the image display device 100 and the external devices 300 may display an icon of a device in which the user preference setting value for the user preference setting is stored.

Meanwhile, when the remote control device 200 transmits the user preference setting storage indication command to an external device 300, the external device 300 receiving the user preference setting storage indication command may display the screen notifying that the user preference setting of the recognized user has been stored on a display (not shown) included in the external device 300.

In addition, if the screen notifying that the user preference setting of the recognized user has been stored is displayed, the image display device 100 or the external device 300 may transmit, to the remote control device 200, a response signal notifying that the screen notifying that the user preference setting of the recognized user has been stored has been displayed.

If a preset time elapses or if a user input for removing the displayed user preference setting screen is received, the image display device 100 or the external device 300 ends the display of the user preference setting screen (S119).

Hereinafter, a user preference setting operation according to an embodiment of the present invention will be described with reference to FIGS. 6 and 7.

Referring to FIG. 6, the remote control device 200 receives a user input for a user preference setting operation (S121).

The controller 280 of the remote control device 200 may receive the user input for the user preference setting operation through at least one of the fingerprint recognition unit 230, the user input unit 230, and the voice acquisition unit 290.

Here, the user preference setting operation may be an operation in which the remote control device 200 sets at least one of the image display device 100 and the external devices 300 to a user preference setting corresponding to the recognized user fingerprint.

In an embodiment, the controller 280 of the remote control device 200 may receive a user input through the fingerprint recognition button 212 included in the fingerprint recognition unit 210 as the user input for the user preference setting operation.

In another embodiment, the controller 280 of the remote control device 200 may receive a user input through the user input unit 230 as the user input for the user preference setting operation.

In still another embodiment, the controller 280 of the remote control device 200 may receive a user voice through the voice acquisition unit 290 as the user input for the user preference setting operation.

Meanwhile, the controller 280 may search at least one of the image display device and the external devices 300 before or after the user input for the user preference setting operation is received. Also, the controller 280 may acquire device information on at least one of the searched image display device and external devices. The operation in which the remote control device 200 searches at least one of the image display device and the external devices and the operation in which the remote control device 200 acquires device information on at least one of the searched image display device and external devices have been described above, and therefore, their detailed descriptions will be omitted.

The remote control device 200 receives a user fingerprint input for recognizing a fingerprint of a user (S123).

The remote control device 200 may receive, from the user, a user input for recognizing the fingerprint of the user. In an embodiment, the remote control device 200 may receive the user input for recognizing the fingerprint of the user through the fingerprint recognition button 212.

Meanwhile, the operation in which the remote control device 200 receives and recognizes the user fingerprint input has been described, and therefore, its detailed description will be omitted.

The remote control device 200 transmits information on the input user fingerprint to the image display device 100 (S125).

In order to acquire user preference setting information corresponding to the input user fingerprint, the controller 280 of the remote control device 200 may transmit the information on the input user fingerprint to the image display device 100 through the wireless communication unit 220.

Here, the information on the input user fingerprint may include an image of the input user fingerprint.

The controller 170 of the image display device 100 acquires user preference setting information corresponding to the information on the transmitted user fingerprint (S127).

In an embodiment, the controller 170 of the image display device 100 may acquire user preference setting information corresponding to the input user fingerprint, based on an image of the transmitted user fingerprint. Specifically, the controller 170 may search a user fingerprint matched to the image of the transmitted user fingerprint among images of a plurality of user fingerprints stored in the storage unit 140, and acquire user preference setting information corresponding to the searched user fingerprint as user preference setting information corresponding to the input user fingerprint.

The controller 170 of the image display device 100 transmits the acquired user preference setting information to the remote control device 200 (S129).

The controller 170 of the image display device 100 may transmit the acquired user preference setting information to the remote control device 200 through the communication unit 160.

The controller 280 of the remote control device 200 generates a user preference setting information on the basis of the transmitted user preference setting information (S131).

The controller 280 of the remote control device 200 may generate a user preference setting signal for setting at least one of the image display device 100 and the external devices 300 as a user preference setting corresponding to the input user fingerprint on the basis of the user preference setting information.

The controller 280 of the remote control device 200 transmits the generated user preference setting signal to an external device 300 corresponding to the user preference setting information (S133).

The controller 280 of the remote control device 200 may transmit the generated user preference setting signal to an external device 300 corresponding to the user preference setting information in a communication scheme corresponding to that of the external device 300 that receives the user preference setting signal through the wireless communication unit 220.

This will be described with reference to FIGS. 19 to 24.

FIGS. 19 to 24 are exemplary diagrams illustrating transmission of a user preference setting signal according to an embodiment of the present invention.

Figure 19:
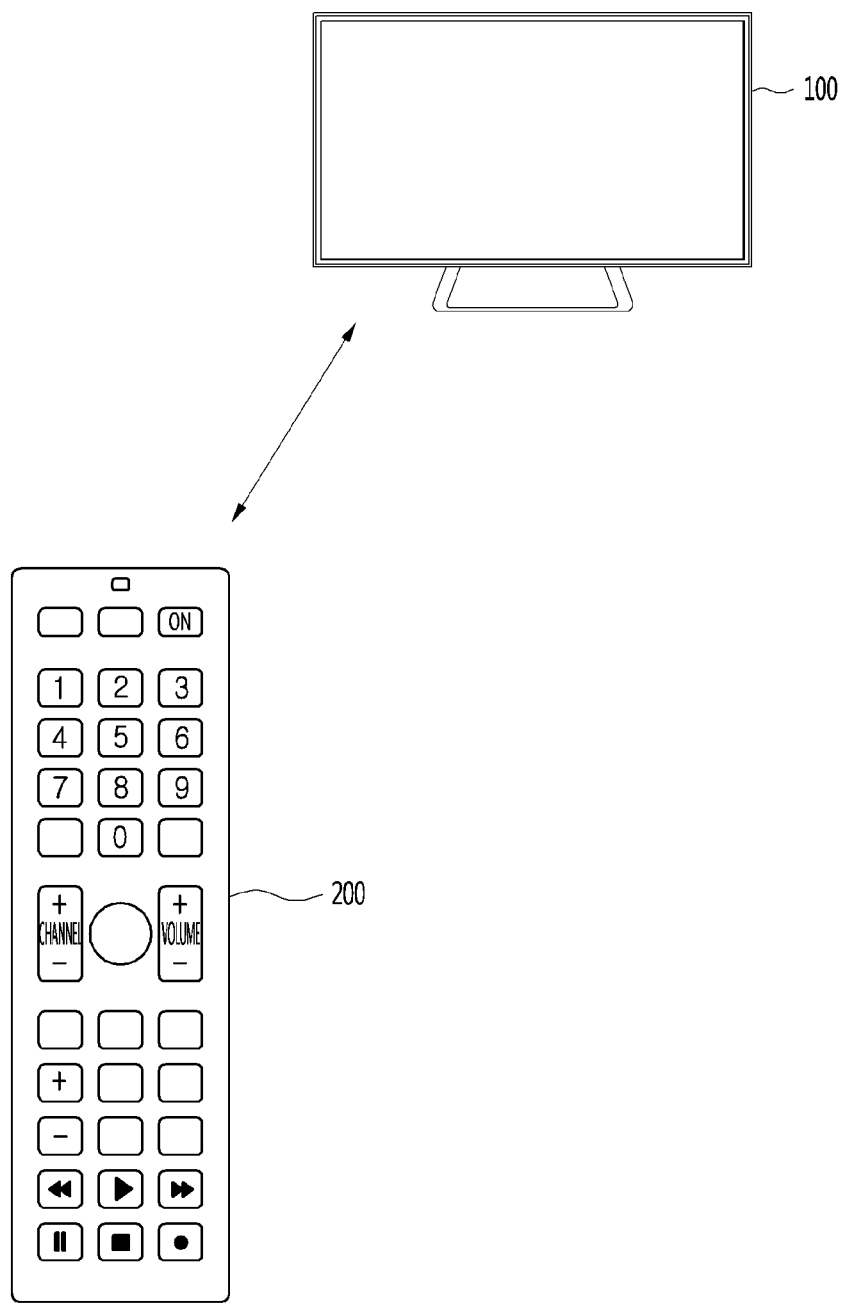
FIGS. 19 to 24 are exemplary diagrams illustrating transmission of a user preference setting signal according to an embodiment of the present invention.

In an embodiment, referring to FIG. 19, when the generated user preference setting signal is a user preference setting signal of the image display device 100, the remote control device 200 may transmit the generated user preference setting signal to the image display device 100 through the RF module 221 or the Bluetooth module 225.

Figure 20:
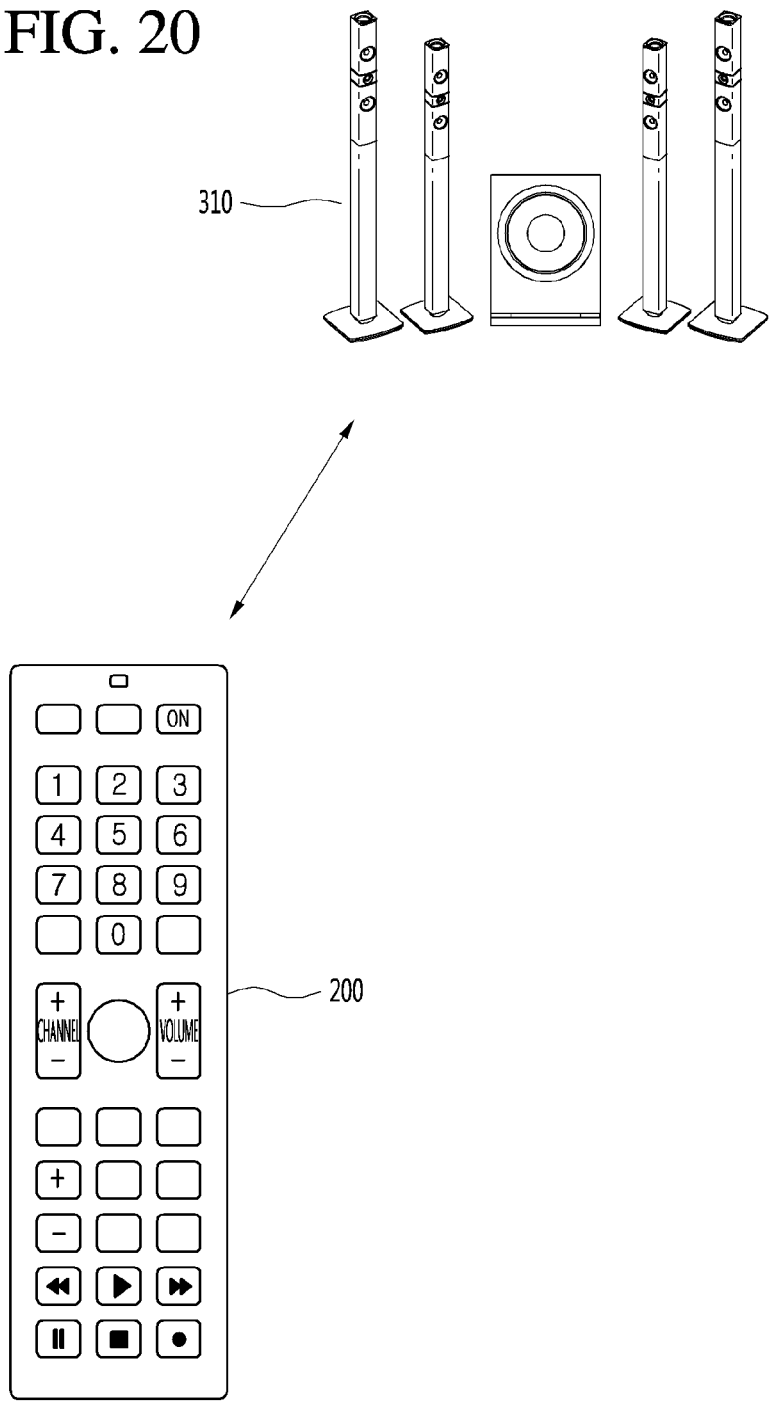

In another embodiment, referring to FIG. 20, when the generated user preference setting signal is a user preference setting signal of the audio device 310, the remote control device 200 may transmit the generated user preference setting signal to the audio device 310 through one of the Bluetooth module 225 and the NFC module 227.

Figure 21:
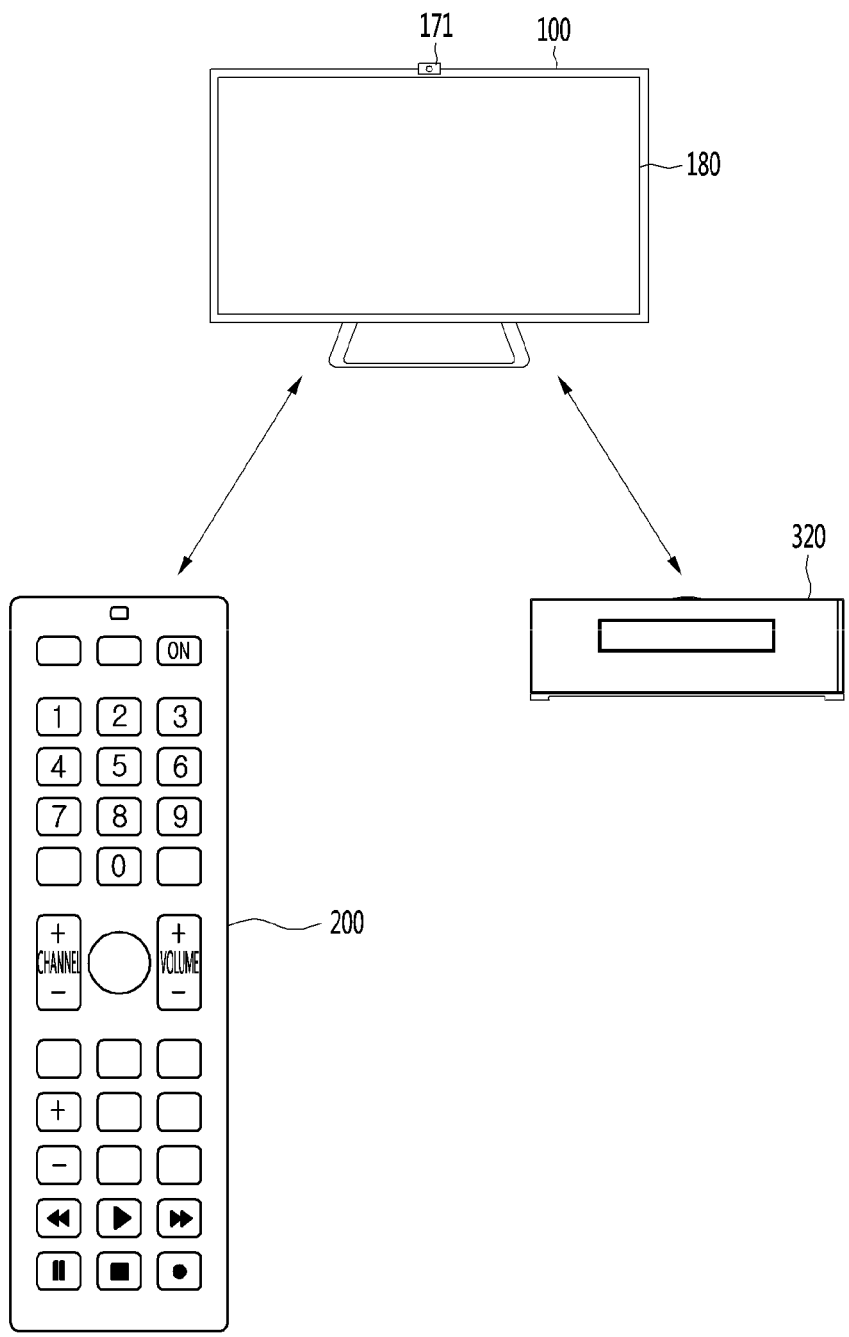

In still another embodiment, referring to FIG. 21, when the generated user preference setting signal is a user preference setting signal of the image output device 320, the remote control device 200 may transmit the generated user preference setting signal to the image output device 320 through the image display device 100. Specifically, the remote control device 200 may transmit the generated user preference setting signal to the image display device 100 through the wireless communication unit 220, to allow the image display device 100 receiving the user preference setting signal to transmit the user preference setting signal to the image output device 320. Here, the image display device 100 transmitting the user preference setting signal to the image output device 320 may transmit the user preference setting signal to the image output device 320 through one of the network interface unit 133, the external device interface unit 135, and the user interface unit 150.

Figure 22:
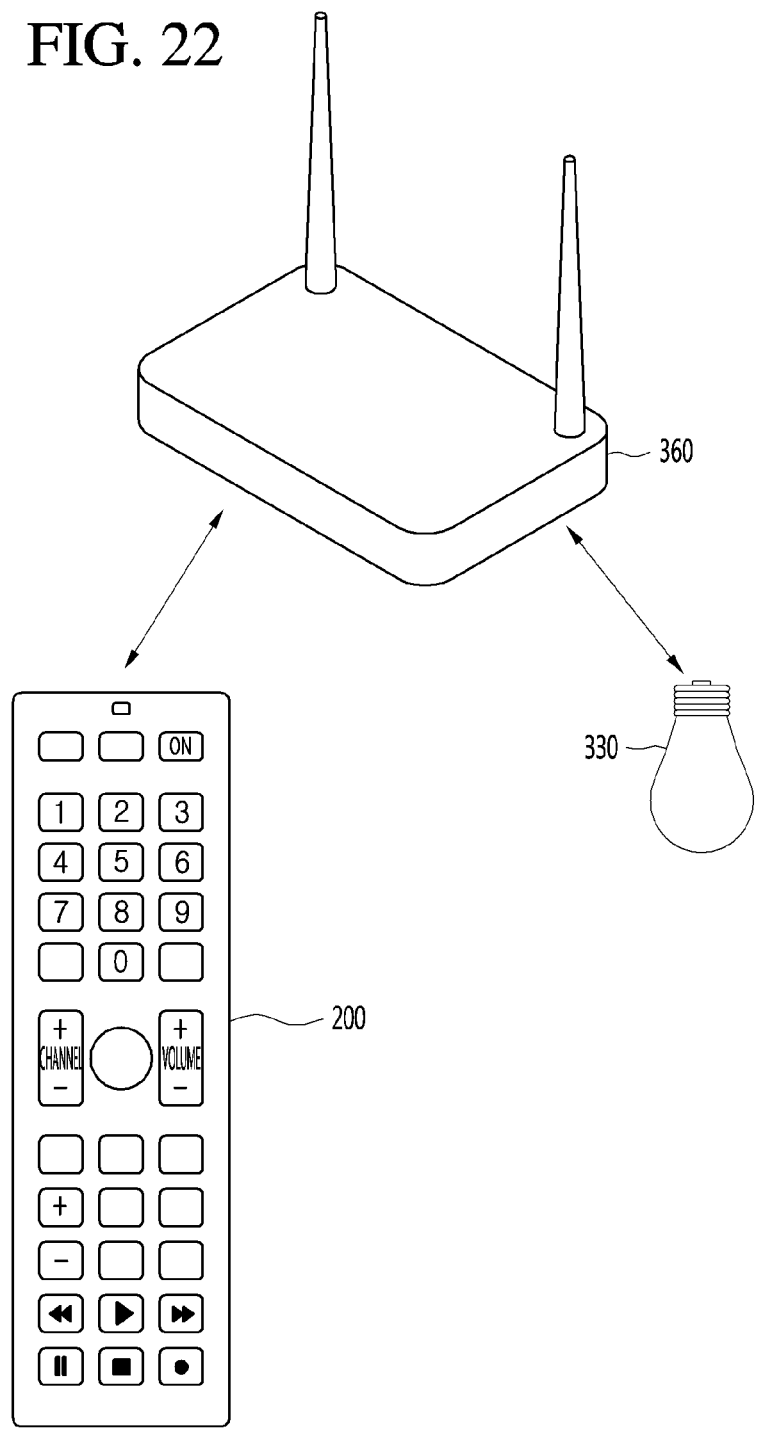

In still another embodiment, referring to FIG. 22, when the generated user preference setting signal is a user preference setting signal of the lighting device 330, the remote control device 200 may transmit the generated user preference setting signal to the lighting device 330 through a wireless access point 360. Specifically, the controller 280 of the remote control device 200 may transmit the generated user preference setting signal to the wireless access point 360 through the WLAN module 229, and allow the wireless access point 360 to transmit the transmitted user preference setting signal to the lighting device 330.

Figure 23:
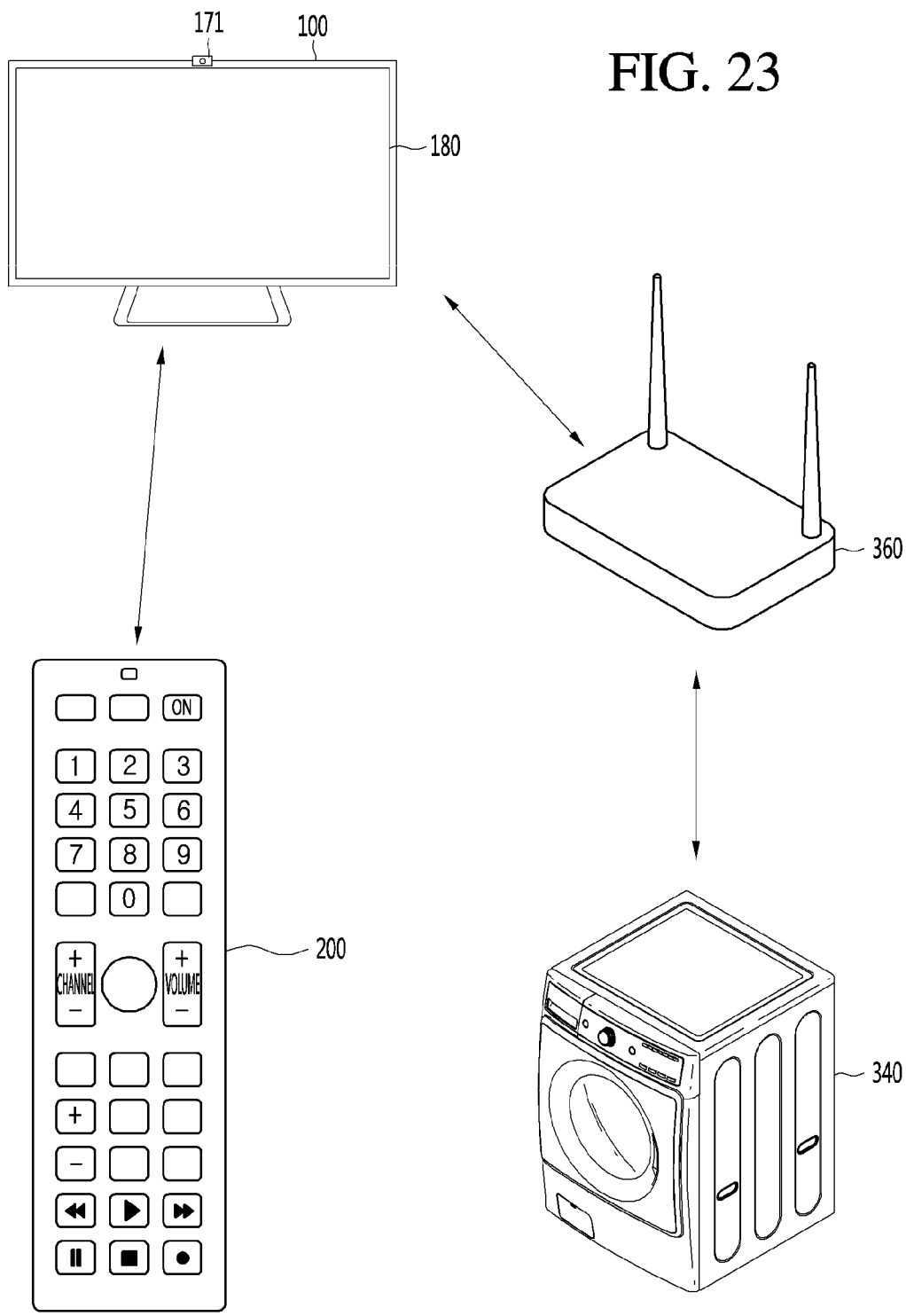

In still another embodiment, referring to FIG. 23, when the generated user preference setting signal is a user preference setting signal of the washing machine 360, the remote control device 200 may transmit the generated user preference setting signal to the washing machine 340 through the image display device 100 and the wireless access point 360. Specifically, the controller 280 of the remote control device 200 may transmit the generated user preference setting signal to the image display device 100 through the wireless communication unit 220, and allow the image display device 100 to transmit the user preference setting signal to the wireless access point 360. In addition, the wireless access point 360 may transmit the transmitted user preference setting signal to the washing machine 340.

Figure 24:
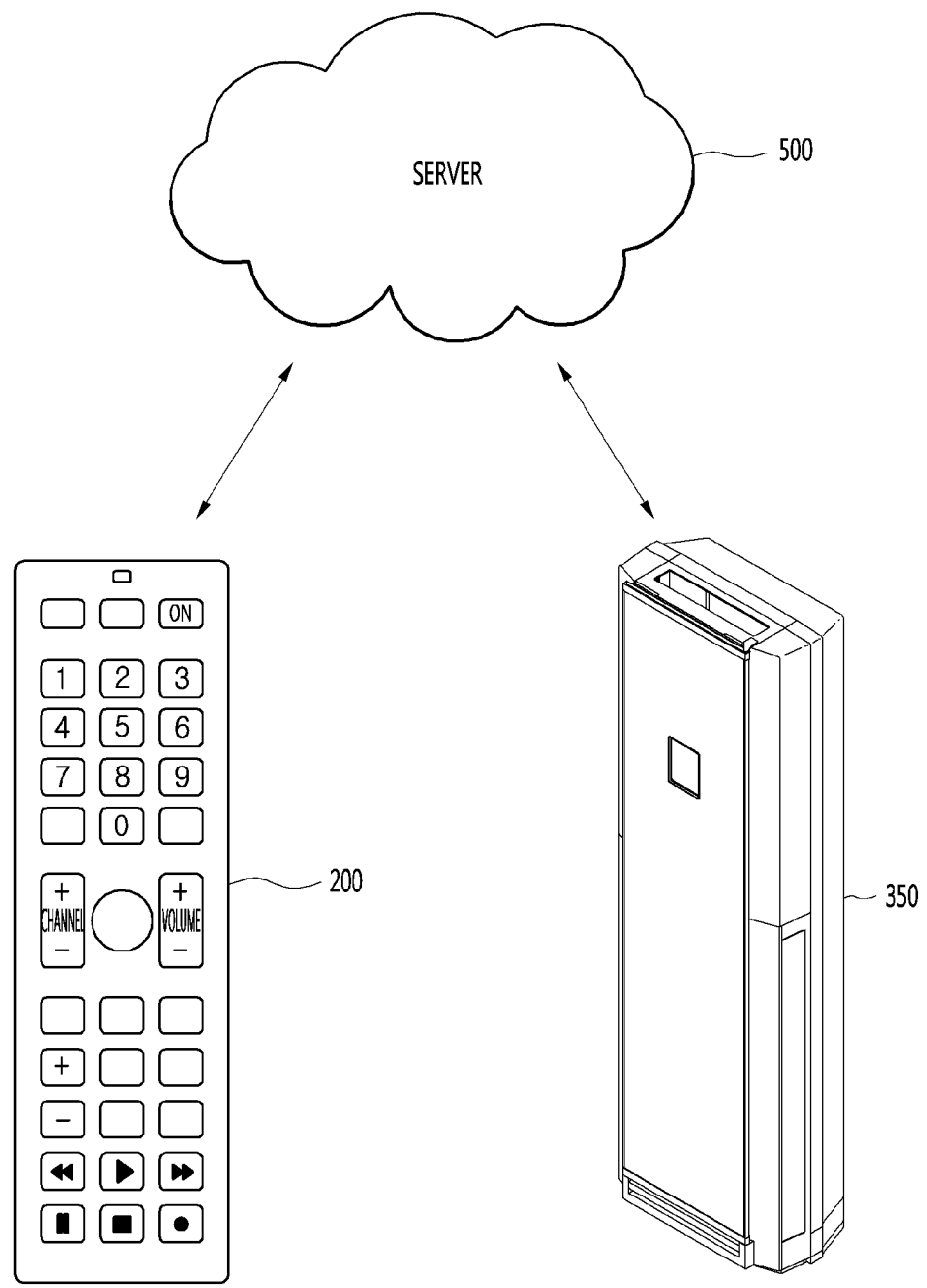

In still another embodiment, referring to FIG. 24, when the generated user preference setting signal is a user preference setting signal of the air conditioner 350, the remote control device 200 may transmit the generated user preference setting signal to the air conditioner 350 through a server 500. Specifically, the controller 280 of the remote control device 200 may transmit the generated user preference setting signal to the server 500 through the wireless communication unit 220, and allow the server 500 to transmit the transmitted user preference setting signal to the air conditioner 350.

The operation in which the remote control device 200 transmits the user preference setting signal is merely an example for description, and the user preference setting signal may be transmitted to the image display device 100 or the external device 300 through various methods according to selections of users or designers and communication schemes of the external device 300. Therefore, the remote control device 200 may directly transmit the user preference setting signal to the image display device 100 or the external device 300 through the wireless communication unit 220. In addition, the remote control device 200 may transmit the user preference setting signal through one of the image display device 100, the wireless access point 360, and the server 500.

The external device 300 performs a user preference setting operation on the basis of the transmitted user preference setting signal (S135).

The external device 300 performs the user preference setting operation, based on the user preference setting signal transmitted from the remote control device 200. Accordingly, the external device 300 may perform the user preference setting operation according to user preference setting information corresponding to the input user fingerprint. Therefore, the external device 300 may perform the user preference setting operation on the basis of the user preference setting value input in step S109.

Meanwhile, when a target to receive the user preference setting signal is the image display device 100, the image display device 100 may also perform the user preference setting operation on the basis of the transmitted user preference setting signal.

The external device 300 transmits a feedback signal for a user preference setting result to the remote control device 200 (S137).

The external device 300 may transmit, to the remote control device 200, a feedback signal for a user preference setting result, corresponding to the performed user preference setting operation.

The controller 280 of the remote control device 200 displays a user preference setting operation completion indication notifying that the user preference setting operation has been performed, based on the transmitted feedback signal (S139).

If the feedback signal is received, the controller 280 of the remote control device 200 may output, through the output unit 250, an image or voice notifying that the user preference setting operation of the external device 300 has been performed.

In addition, the controller 280 of the remote control device 200 may allow the image display device 100 or the external device 100 to display the user preference setting operation completion indication.

This will be described with reference to FIGS. 25 and 26.

Figure 25:
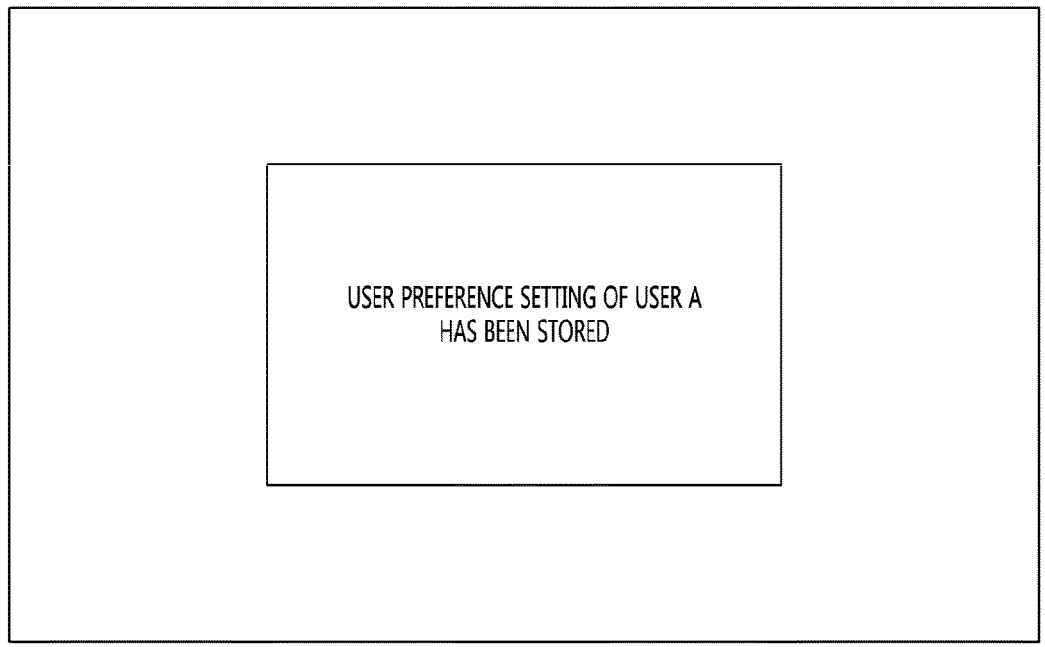
FIGS. 25 and 26 illustrate display of user preference setting operation completion.
Figure 26:
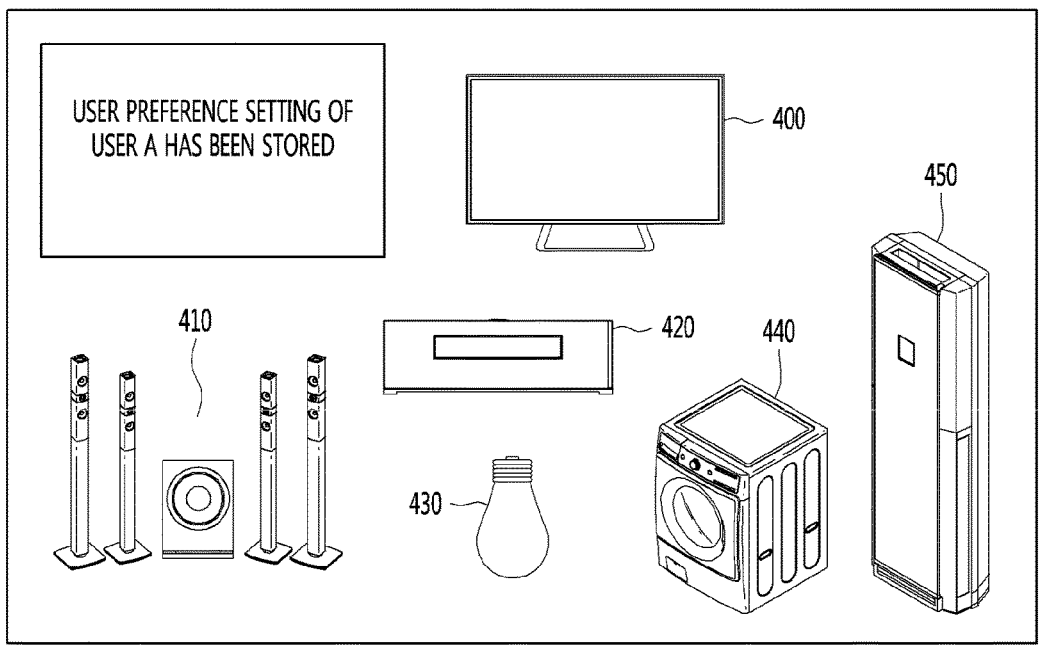

FIGS. 25 and 26 illustrate display of user preference setting operation completion.

The controller 280 of the remote control device 200 may transmit a user preference setting operation completion indication signal to the image display device 100 or the external device 300. Accordingly, as shown in FIG. 25, the image display device 100 or the external device 300 may display an indication notifying that the user preference setting has been set through the display unit 180 or the display (not shown).

As shown in FIG. 26, the image display device 100 or the external device 300 may display the indication notifying that the user preference setting has been set through the display unit 180 or the display (not shown) and the icons 400, 410, 420, 430, 440, and 450 representing the devices on which the user preference setting has been performed.

Meanwhile, the controller 280 of the remote control device 200 does not perform the acquisition of the user preference setting information, corresponding to steps S125 to S129, through the image display device 100, but may perform, by itself, the acquisition of the user preference setting information.

This will be described with reference to FIG. 7.

Referring to FIG. 7, the remote control device 200 receives a user input for a user preference setting operation (S221), and receives a user fingerprint input (S223). The operation in which the remote control device 200 receives the user input for the user preference setting operation and the operation in which the remote control device 200 receives the user fingerprint input are identical to those in steps S121 to S123 of FIG. 6. Therefore, their detailed descriptions will be omitted.

The remote control device 200 acquires user preference setting information corresponding to the input user fingerprint (S227).

In an embodiment, the controller 280 of the remote control device 200 may acquire user preference setting information corresponding to the input user fingerprint, based on the transmitted image of the user fingerprint. Specifically, the controller 280 may search a user fingerprint matched to the image of the user fingerprint among images of the plurality of stored user fingerprints, and acquire user preference setting information corresponding to the searched user fingerprint as the user preference setting information corresponding the input user fingerprint.

The controller 280 of the remote control device 200 generates a user preference setting signal on the basis of the acquired user preference setting information (S213). Subsequently, the controller 280 of the remote control device 200 transmits the generated user preference setting signal to the image display device 100 or the external device 300 (S233). The image display device 100 or the external device 100, which receives the user preference setting signal, performs a user preference setting operation (S235). In addition, the image display device 100 or the external device 300 transmits a feedback signal for a user preference setting result to the remote control device 200 (S237). The remote control device 200 displays a user preference setting operation completion indication (S239). Here, the operations in steps S231 to 239 are identical to those in step S131 to S139, and therefore, their detailed descriptions will be omitted.

As described above, the remote control device 200 of the present invention can acquire user preference setting information corresponding to the input user fingerprint in various methods.

Further, the remote control device 200 of the present invention can set a setting value of the external device corresponding to the input fingerprint as a user preference setting value.

Furthermore, the remote control device 200 of the present invention can transmit a user preference setting signal to the image display device 100 or the external device 300 through various communication schemes.

According to an embodiment of the present invention, the foregoing method can be implemented as codes readable by a processor on a medium written by the program. Examples of the computer-readable media can include ROM, RAM, CD-ROM, magnetic tape, floppy disk, and optical data storage device, and the like, and also include a device implemented via a carrier wave (for example, a transmission via the Internet).

The remote control device described above will not be applicable in a limited way to the configurations and methods of the above-described embodiments, and all or part of each embodiment can be selectively combined and configured to make various modifications thereto.

The invention claimed is:

1. A method for operating a remote control device that controls an image display device and external devices, the method comprising:
   searching at least one of the image display device and external devices;
   acquiring device information on at least one of the searched image display device and external devices;
   receiving an input first fingerprint for a user preference setting operation of setting at least one of the image display device and external devices to a personalized setting of a user;
   acquiring user preference setting information including a setting value of the user preference setting operation on the basis of the acquired device information and a first fingerprint image corresponding to the input first fingerprint;
   setting the image display device or external device corresponding to the acquired user preference setting information to the personalized setting of the user corresponding to the first fingerprint on the basis of the user preference setting information;
   transmitting to the at least one of the image display device and external devices a first control signal for displaying a first screen of selecting a device that becomes a target of a user preference setting; and
   transmitting to the at least one of the image display device and external devices a second control signal for displaying a screen of receiving input for the user preference setting information corresponding to a selected device according to the first screen.

2. The method according to claim 1, wherein the searching of the at least one of the image display device and external devices includes:
   generating a search signal for searching at least one of the image display device and external devices;
   transmitting the generated search signal to the at least one of the image display device and external devices;
   receiving a response signal to the transmitted search signal; and
   recognizing the at least one of the image display device and external devices on the basis of the received response signal.

3. The method according to claim 1, wherein the searching of the at least one of the image display device and external devices includes:
   tagging, to the remote control device, at least one of the image display device and external devices within a predetermined distance from the remote control device; and
   receiving a response signal from the at least one of the tagged image display device and external devices.

4. The method according to claim 1, wherein the acquiring of the device information includes acquiring device information on the at least one of the searched image display device and external devices from each of the searched image display device and external devices.

5. The method according to claim 1, wherein the acquiring of the device information includes acquiring device information on the at least one of the searched image display device and external devices from a server connected to the remote control device.

6. The method according to claim 4, wherein the acquiring of the device information includes acquiring information on at least one of a kind, a manufacturer, a product model name, an available communication scheme, a control code, and an operation state of the at least one of the searched image display device and external devices.

7. The method according to claim 1, wherein the acquiring of the user preference setting information includes:
   searching a user fingerprint image matched to the first fingerprint image among previously stored user fingerprint images; and
   acquiring user preference setting information corresponding to the acquired device information and the searched user fingerprint image.

8. The method according to claim 1, wherein the setting of the at least one of the image display device and external devices to the personalized setting includes:
   generating a user preference setting signal on the basis of the acquired user preference setting information; and
   transmitting the generated user preference setting signal to the image display device or external device corresponding to the acquired user preference setting signal.

9. The method according to claim 8, wherein the transmitting of the user preference setting signal includes transmitting the user preference setting signal through at least one of the image display device, a wireless access point associated with the image display device or external device, and the server.

10. The method according to claim 1, further comprising:
    receiving an input second fingerprint for setting the user preference setting information; and
    receiving a user input for inputting user preference setting information including the acquired device information and a setting value of the user preference setting operation corresponding to the second fingerprint.

11. A remote control device that controls an image display device and external devices, the remote control device comprising:
    a user input receiver;
    a wireless communicator configured to transmit/receive signals;
    a fingerprint recognizer configured to receive an input first fingerprint of a user for a user preference setting operation of setting at least one of the image display device and external devices to a personalized setting of the user; and
    a controller configured to:
      search at least one of the image display device and external devices, acquire device information on the at least one of the searched image display device and external devices, acquire user preference setting information including a setting value of the user preference setting operation on the basis of a first fingerprint image corresponding to the input first fingerprint, and set the image display device or external device corresponding to the acquired user preference setting information to a personalized setting of the user corresponding to the first fingerprint on the basis of the user preference setting information;
      transmit to the at least one of the image display device and external devices a first control signal for displaying a first screen of selecting a device that becomes a target of a user preference setting; and
      transmit to the at least one of the image display device and external devices a second control signal for displaying a screen of receiving input for the user preference setting information corresponding to a selected device according to the first screen.

12. The remote control device according to claim 11, wherein the controller generates a search signal for searching at least one of the image display device and external devices, transmits the generated search signal to the at least one of the image display device and external devices through the wireless communicator, receives a response signal to the transmitted search signal through the wireless communicator, and recognizes the at least one of the image display device and external devices on the basis of the received response signal.

13. The remote control device according to claim 11, wherein the controller tags at least one of the image display device and external devices within a predetermined distance from the remote control device through the wireless communicator, and receives a response signal from the at least one of the tagged image display device and external devices.

14. The remote control device according to claim 11, wherein the controller acquires device information on the at least one of the searched image display device and external devices from each of the searched image display device and external devices.

15. The remote control device according to claim 11, wherein the controller acquires device information on the at least one of the searched image display device and external devices from a server connected to the remote control device.

16. The remote control device according to claim 14, wherein the device information includes information on at least one of a kind, a manufacturer, a product model name, an available communication scheme, a control code, and an operation state of the at least one of the searched image display device and external devices.

17. The remote control device according to claim 11, wherein the controller searches a user fingerprint image matched to the first fingerprint image among previously stored user fingerprint images, and acquires user preference setting information corresponding to the acquired device information and the searched user fingerprint image.

18. The remote control device according to claim 11, wherein the controller generates a user preference setting signal on the basis of the acquired user preference setting information, and transmits the generated user preference setting signal to the image display device or external device corresponding to the acquired user preference setting signal through the wireless communicator.

19. The remote control device according to claim 18, wherein the controller transmits the user preference setting signal through at least one of the image display device, a wireless access point associated with the image display device or external device, and the server.

20. The remote control device according to claim 11, wherein the fingerprint recognizer receives an input second fingerprint for setting the user preference setting information,
  wherein the controller acquires, through the user input, receiver, a user input for inputting user preference setting information including the acquired device information and a setting value of the user preference setting operation corresponding to the second fingerprint, and stores the acquired setting value of the user preference setting operation, corresponding to the input second fingerprint.

* * * * *